(12) United States Patent
Kim et al.

(10) Patent No.: US 10,687,634 B1
(45) Date of Patent: Jun. 23, 2020

(54) INTERNALLY TENSIONED INFLATABLE STRUCTURES

(71) Applicant: GM GLOBAL TECHNOLOGY OPERATIONS LLC, Detroit, MI (US)

(72) Inventors: Wonhee M. Kim, Royal Oak, MI (US); Paul W. Alexander, Ypsilanti, MI (US); Nancy L. Johnson, Northville, MI (US); Nilesh D. Mankame, Ann Arbor, MI (US); Daniel W. Booth, Troy, MI (US); Paul E. Krajewski, Troy, MI (US); Taeyoung Han, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/566,584

(22) Filed: Sep. 10, 2019

(51) Int. Cl.
*A47C 27/08* (2006.01)

(52) U.S. Cl.
CPC .......... *A47C 27/087* (2013.01); *A47C 27/081* (2013.01)

(58) Field of Classification Search
None
See application file for complete search history.

(56) References Cited

U.S. PATENT DOCUMENTS

| 4,292,701 | A | * | 10/1981 | Woychick | ............ | A47C 21/048 |
| | | | | | | 5/422 |
| 4,826,715 | A | * | 5/1989 | Lee | ............ | A47C 27/081 |
| | | | | | | 428/64.1 |
| 5,152,018 | A | * | 10/1992 | Lea | ............ | A47C 17/70 |
| | | | | | | 5/420 |
| 9,821,862 | B2 | | 11/2017 | Han et al. | | |
| 10,398,235 | B2 | * | 9/2019 | Lin | ............ | A47C 27/081 |
| 2004/0188988 | A1 | * | 9/2004 | Wipasuramonton | ............ | |
| | | | | | | B60R 21/214 |
| | | | | | | 280/730.1 |
| 2006/0288489 | A1 | * | 12/2006 | Yang | ............ | A47C 27/081 |
| | | | | | | 5/712 |
| 2007/0046001 | A1 | * | 3/2007 | Hirata | ............ | B60R 21/232 |
| | | | | | | 280/730.2 |
| 2007/0200329 | A1 | * | 8/2007 | Ma | ............ | B60R 21/231 |
| | | | | | | 280/743.1 |
| 2008/0296946 | A1 | * | 12/2008 | Reynolds | ............ | B60N 2/525 |
| | | | | | | 297/284.6 |

(Continued)

OTHER PUBLICATIONS

U.S. Appl. No. 15/954,788, filed Apr. 14, 2018, Khalighi et al.

(Continued)

*Primary Examiner* — David E Allred

(57) ABSTRACT

An inflatable system includes a bladder configured to contain fluid, a first plurality of tethers disposed within a first region of the bladder, and a second plurality of tethers disposed within a second region of the bladder. The first plurality of tethers has a first tether length, a first tether spacing, a first tether angle relative to one wall of the bladder, and a first tether stiffness. The second plurality of tethers has a second tether length, a second tether spacing, a second tether angle relative to the one wall, and a second tether stiffness. At least one of: the second tether length is different than the first tether length; the second tether spacing is different than the first tether spacing; the second tether angle is different than the first tether angle; and the second tether stiffness is different than the first tether stiffness.

13 Claims, 13 Drawing Sheets

(56) References Cited

U.S. PATENT DOCUMENTS

| | | | | |
|---|---|---|---|---|
| 2009/0320211 | A1* | 12/2009 | Lau | A47C 27/081 5/713 |
| 2014/0101861 | A1* | 4/2014 | Gowda | A47C 27/088 5/709 |
| 2015/0201760 | A1* | 7/2015 | Lin | A47C 27/081 5/710 |
| 2017/0042338 | A1* | 2/2017 | Yang | A47C 27/084 |
| 2017/0106830 | A1 | 4/2017 | Rohn et al. | |
| 2018/0065690 | A1 | 3/2018 | Han et al. | |
| 2018/0281874 | A1 | 10/2018 | Han et al. | |
| 2019/0195427 | A1 | 6/2019 | Alexander et al. | |
| 2019/0299909 | A1* | 10/2019 | Alexander | B60R 21/2334 |

OTHER PUBLICATIONS

U.S. Appl. No. 15/970,221, filed May 3, 2018, Dadheech et al.
U.S. Appl. No. 16/114,423, filed Aug. 28, 2018, Alexander et al.
U.S. Appl. No. 16/227,177, filed Dec. 20, 2018, Han et al.
U.S. Appl. No. 16/443,029, filed Jun. 17, 2019, Han et al.
U.S. Appl. No. 16/566,374, filed Sep. 10, 2019, Han et al.
U.S. Appl. No. 16/566,631, filed Sep. 10, 2019, Kim et al.
U.S. Appl. No. 16/566,683, filed Sep. 10, 2019, Kim et al.

* cited by examiner

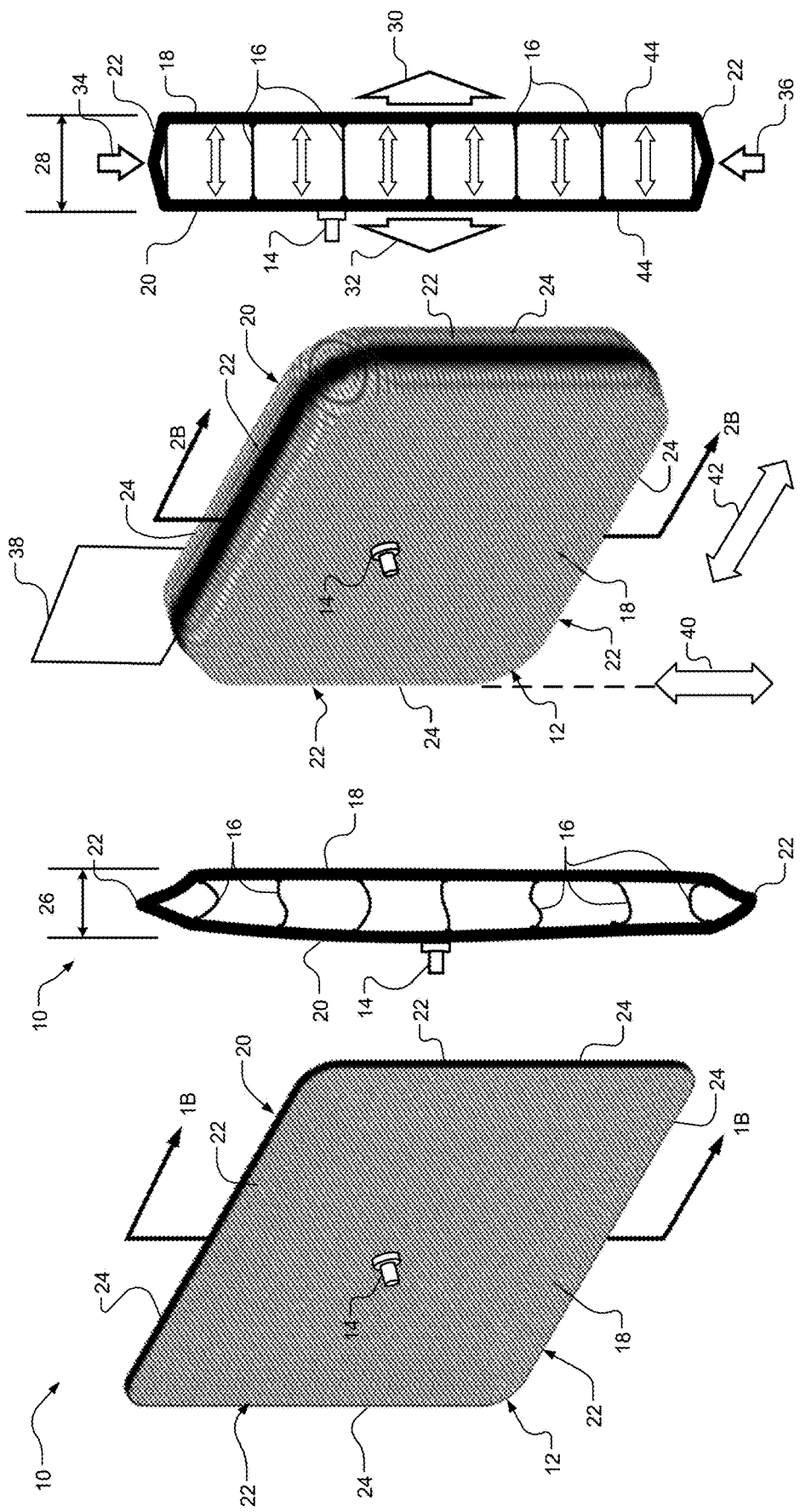

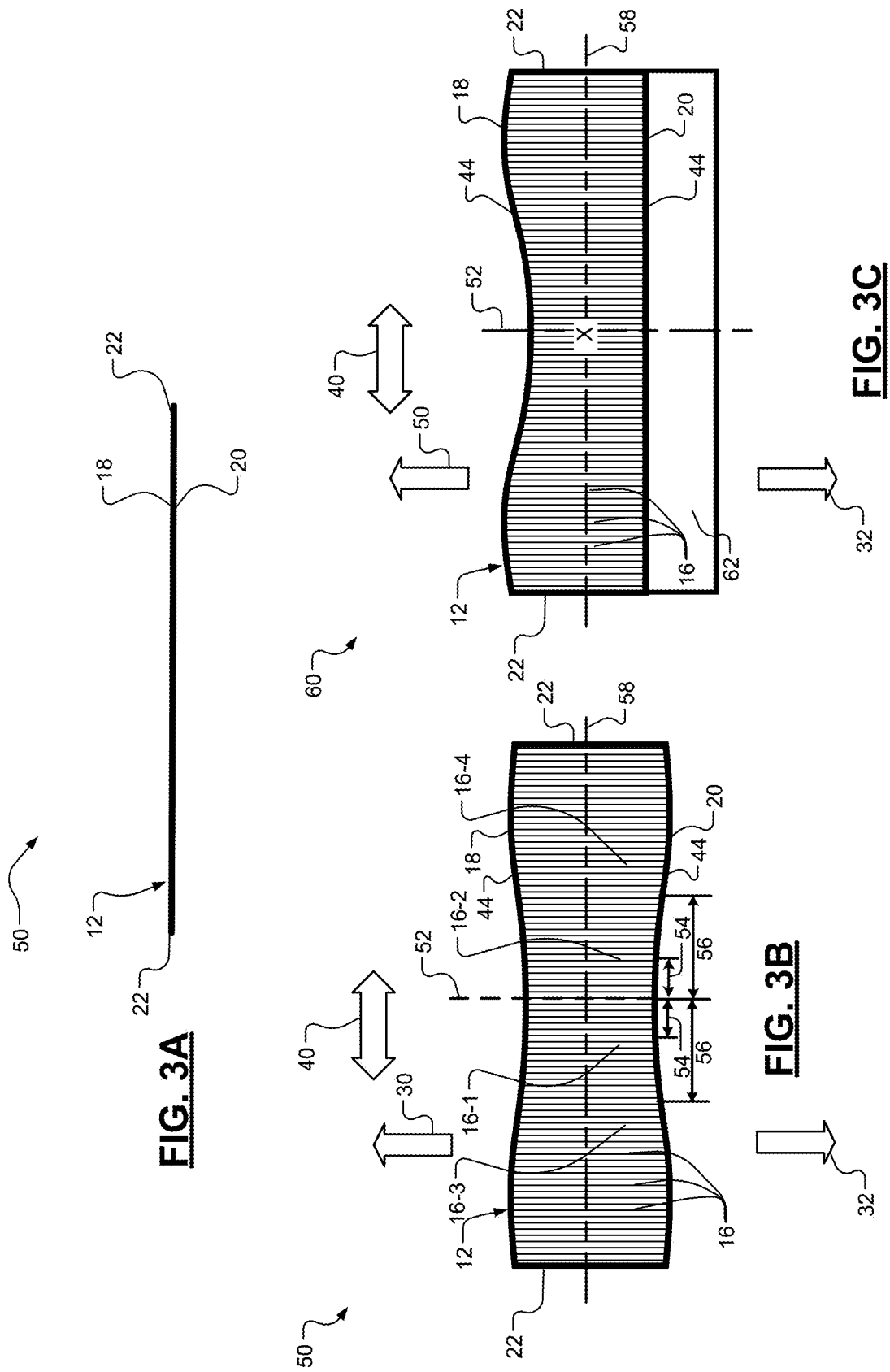

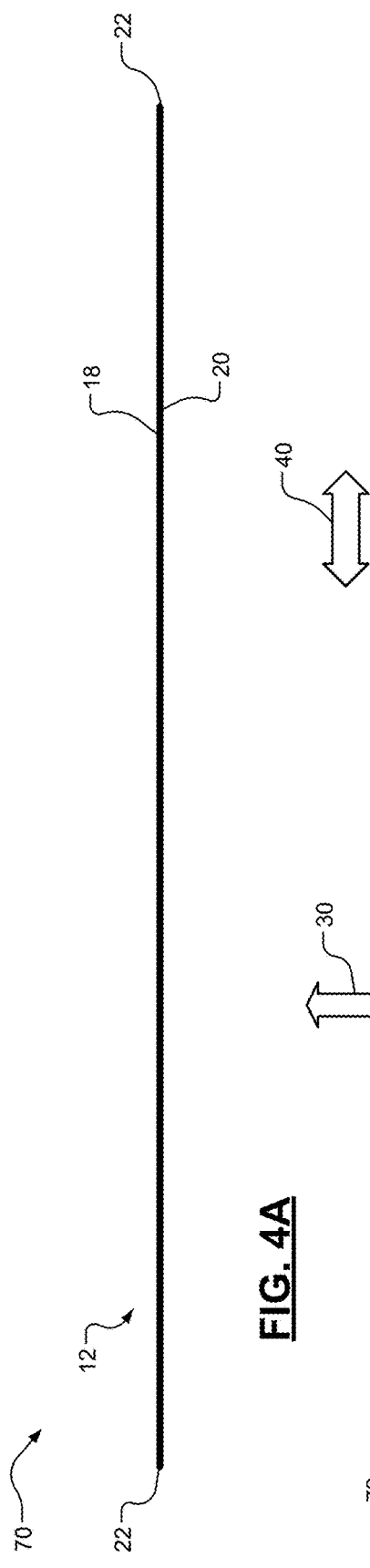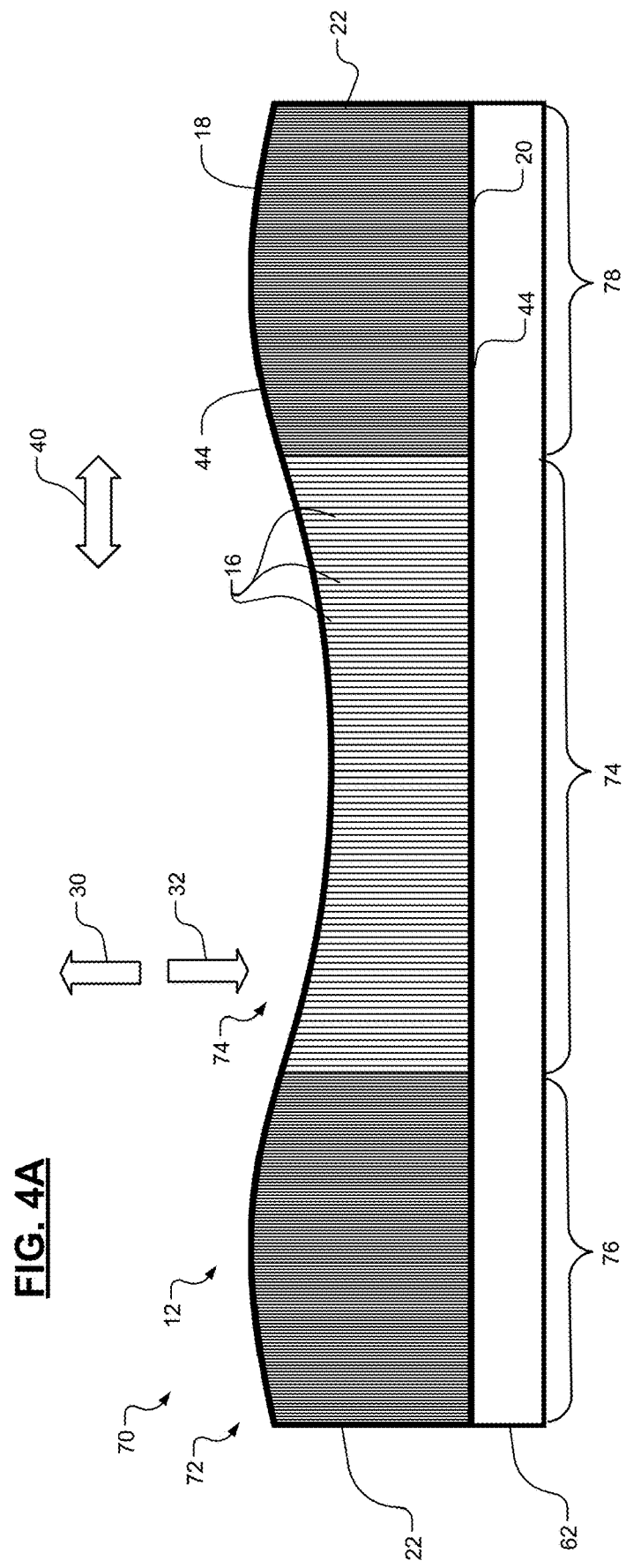

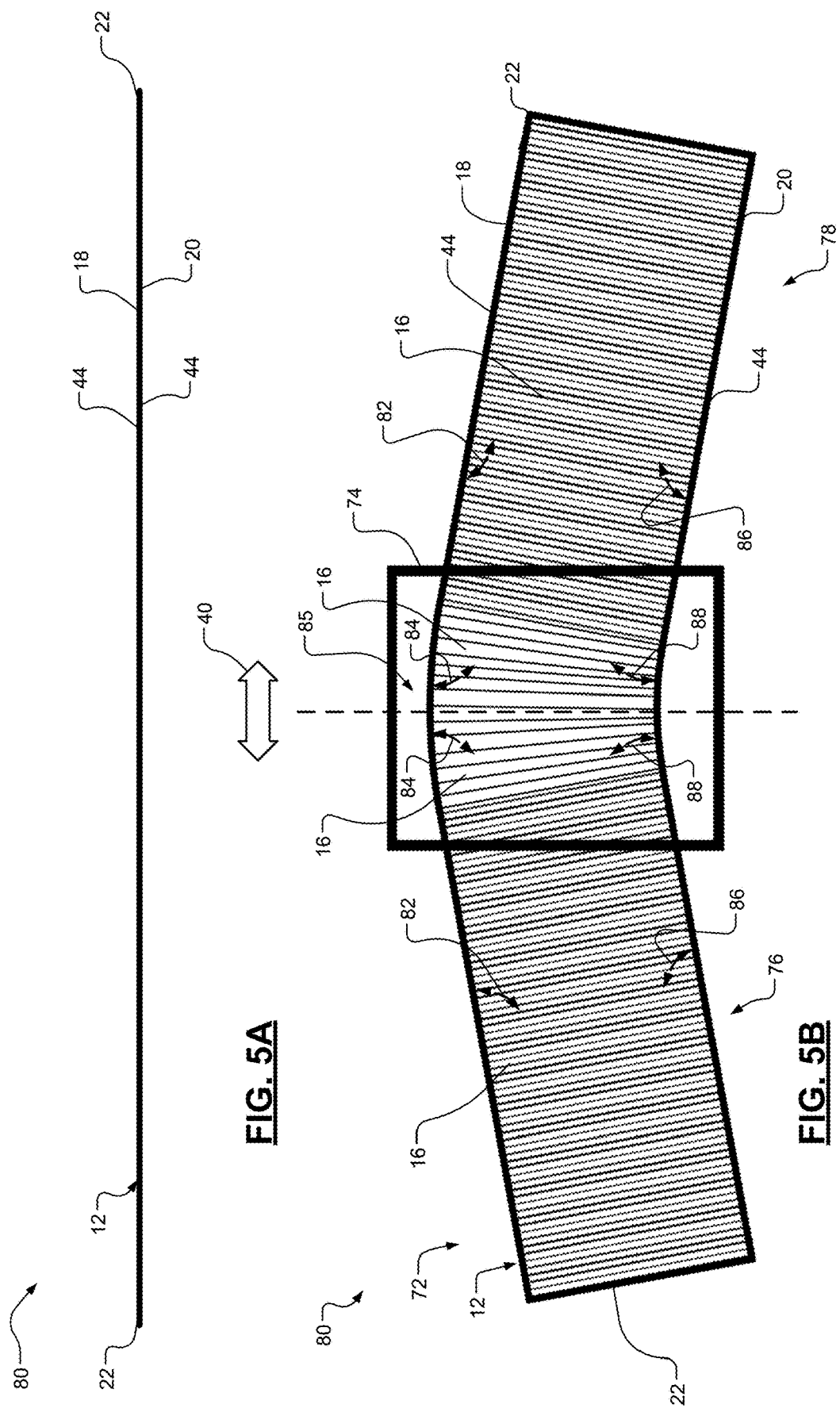

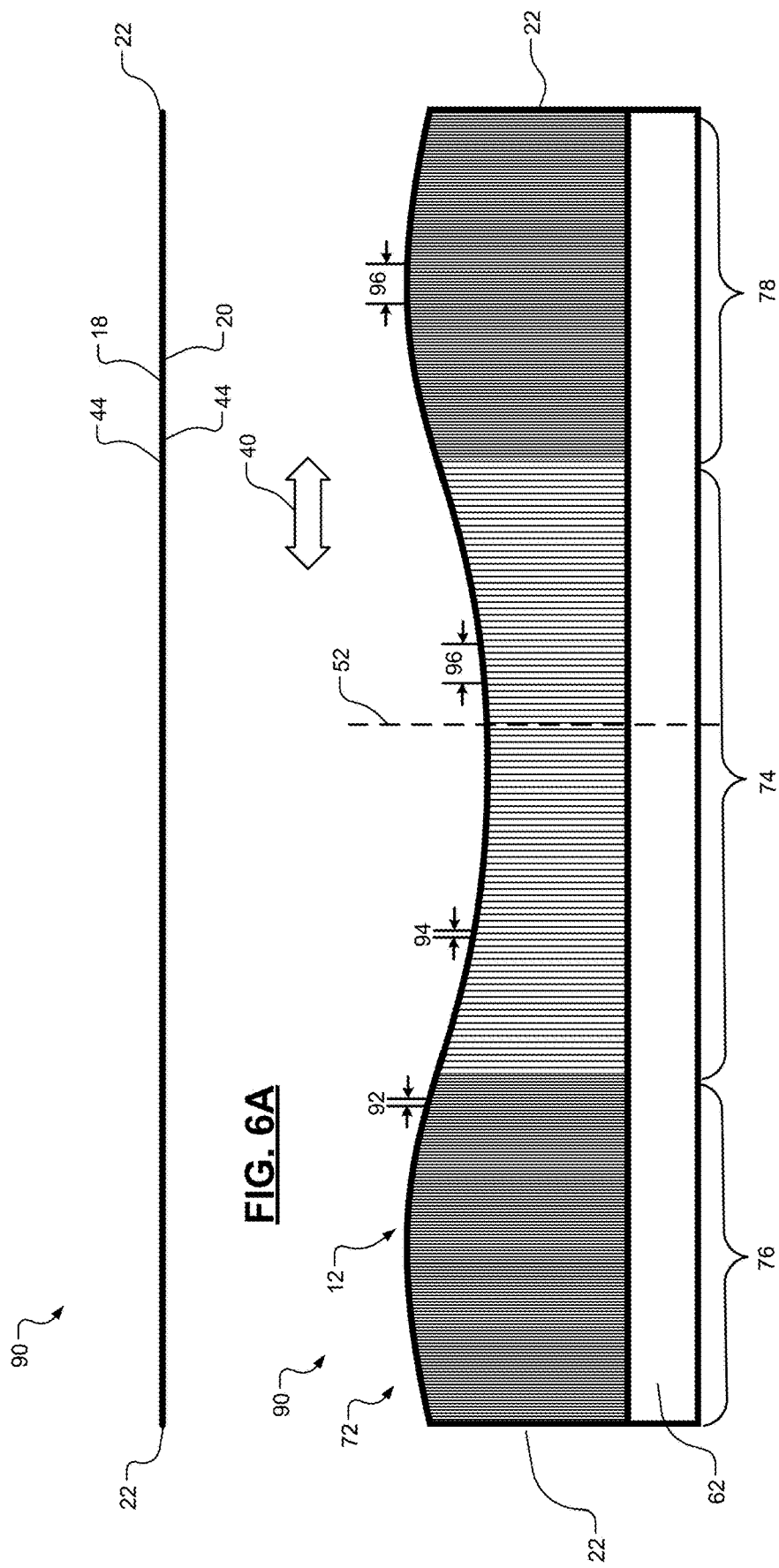

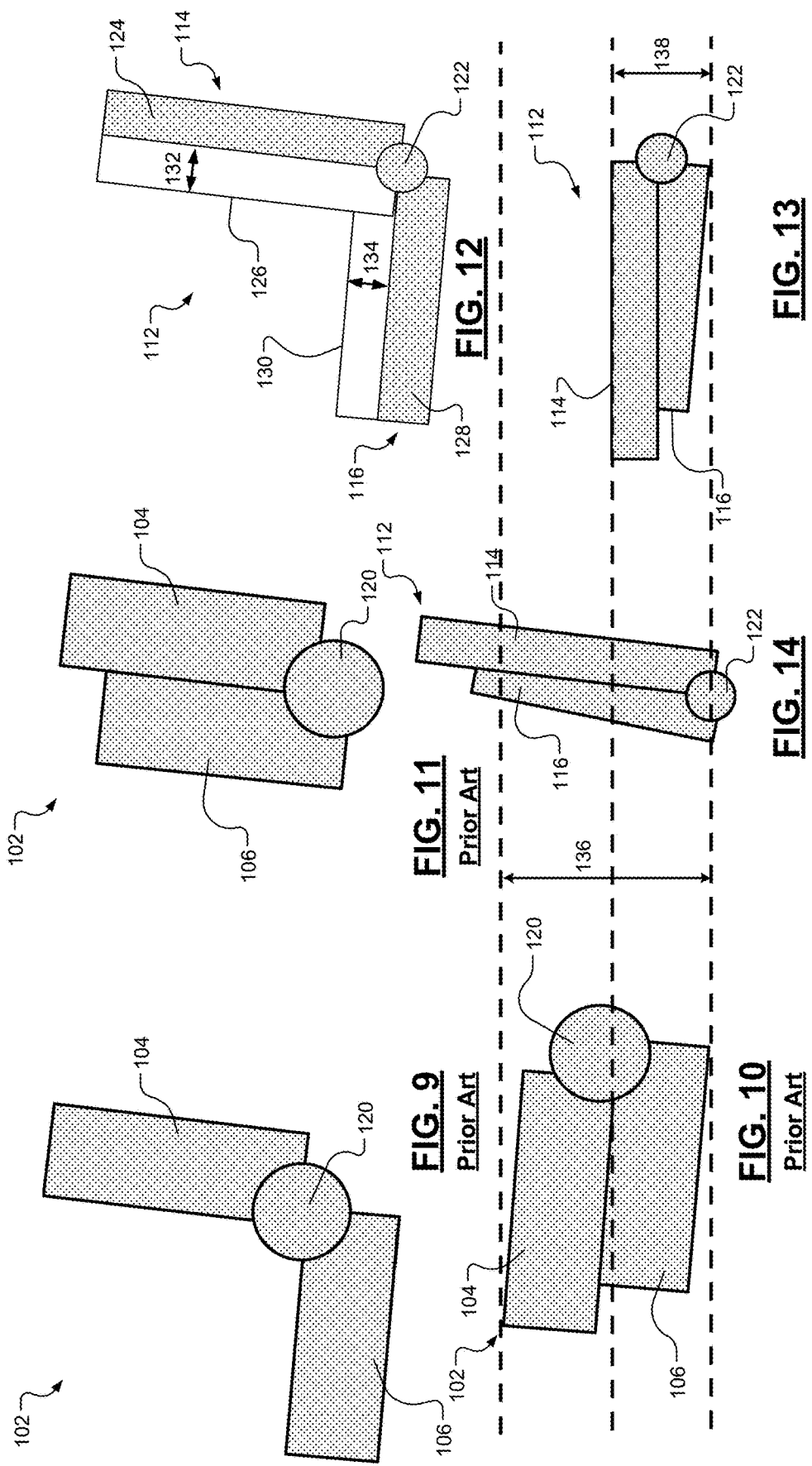

INTERNALLY TENSIONED INFLATABLE STRUCTURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internally tensioned inflatable structures.

Internally tensioned inflatable structures typically include a bladder that holds pressurized air and threads that are attached to opposite internal surfaces of the bladder. The threads are typically attached to the internal surfaces of the bladder using drop stitching, which yields equal spacing between the stitches. As the bladder is inflated, the pressure within the bladder causes the bladder to expand outward and thereby applies tension to the threads, which in turn limits expansion of the bladder. In addition to limiting expansion of the bladder, the threads increase the amount of compressive load that the bladder may withstand before the bladder deforms due to the compressive load. Thus, internally tensioned inflatable structures are used in devices such as airplane wings that require a high compressive strength to weight ratio.

Internally tensioned inflatable structures typically have a homogeneous or uniform thickness with flat external surfaces. In addition, the manufacturing process used to make internally tensioned inflatable structures is typically labor intensive.

SUMMARY

An inflatable system according to the present disclosure includes a bladder configured to contain fluid, a first plurality of tethers, and a second plurality of tethers. The bladder includes a top wall, a bottom wall opposite of the top wall, and side walls disposed between the top and bottom walls along perimeter edges thereof. The first plurality of tethers extend between and are connected to the top and bottom walls of the bladder within a first region of the bladder. The first plurality of tethers has a first tether length, a first tether spacing within a first plane, a first tether angle relative to one of the top and bottom walls within the first plane, and a first tether stiffness. The second plurality of tethers extend between and are connected to the top and bottom walls of the bladder within a second region of the bladder, the second plurality of tethers having a second tether length, a second tether spacing within the first plane, a second tether angle relative to the one of the top and bottom walls within the first plane, and a second tether stiffness. At least one of: the second tether length is different than the first tether length; the second tether spacing is different than the first tether spacing; the second tether angle is different than the first tether angle; and the second tether stiffness is different than the first tether stiffness.

In one example, the system further includes a bottom plate attached to the bottom wall.

In one example, the system further includes a valve configured to allow fluid flow into and out of the bladder.

In one example, the second tether length is greater than the first tether length.

In one example, each tether in the first plurality of tethers has the first tether length, and each tether in the second plurality of tethers has the second tether length.

In one example, the second tether stiffness is greater than the first tether stiffness.

In one example, the first tether angle is a right angle and the second tether angle is an oblique angle.

In one example, the second tether spacing is greater than the first tether spacing.

In one example, the first region includes a first sub region disposed adjacent to a first one of the side walls and a second sub region disposed adjacent to a second one of the side walls opposite of the first side wall, and the second region is disposed between the first and second sub regions.

In one example, at least two of: the second tether length is different than the first tether length; the second tether spacing is different than the first tether spacing; the second tether angle is different than the first tether angle; and the second tether stiffness is different than the first tether stiffness.

A vehicle seat according to the present disclosure includes a seat bottom and a seat back. At least one of the seat bottom and the seat back includes a first bladder configured to contain fluid and a first plurality of tethers disposed within the first bladder. The first bladder includes a top wall, a bottom wall opposite of the top wall, and side walls disposed between the top and bottom walls along a perimeter of the first bladder, the first plurality of tethers extending between and connected to the top and bottom walls. The first bladder is configured to be deflated when the vehicle seat is stowed and inflated when the vehicle seat is upright.

In one example, the seat bottom includes a first foam cushion and the first bladder, the first bladder is attached to the first foam cushion, one of the first foam cushion and the first bladder is configured to be disposed between an occupant, and the other one of the first foam cushion and the first bladder when the occupant is sitting in the vehicle seat. The seat back includes a second foam cushion and a second bladder configured to contain fluid and a second plurality of tethers disposed within the second bladder. The second bladder includes a top wall, a bottom wall opposite of the top wall of the second bladder, and side walls disposed between the top and bottom walls of the second bladder along a perimeter of the second bladder. The second plurality of tethers extend between and are connected to the top and bottom walls of the second bladder. The first and second bladders are configured to be deflated when the vehicle seat is stowed and inflated when the vehicle seat is upright. The second bladder is attached to the second foam cushion. One of the second foam cushion and the second bladder is configured to be disposed between the occupant and the other one of the second foam cushion and the second bladder when the occupant is sitting in the vehicle seat.

In one example, at least one of the first and second plurality of tethers has at least one of a varied tether length, a varied tether spacing, a varied tether angle, and a varied tether material.

A solar panel system according to the present disclosure includes a first inflatable structure and a compressor. The first inflatable structure is mounted to an exterior wall of a vehicle. The first inflatable structure includes a first bladder, a first plurality of tethers disposed within the first bladder, and a first film of photovoltaic material attached to an exterior surface of the first bladder. The compressor is in fluid communication with the first inflatable structure such that the compressor is operable to inflate the first inflatable structure.

In one example, the solar panel system of further includes a second inflatable structure, the second inflatable structure including a second bladder, a second plurality of tethers disposed within the second bladder, and a second film of photovoltaic material attached to an exterior surface of the second bladder. The compressor is also in fluid communication with the second inflatable structure such that the compressor is operable to inflate the second inflatable structure.

In one example, the solar panel system of further includes a first roller, a second roller, a motor, and a gearset. The first and second rollers are mounted to the exterior wall of the vehicle, and the first and second inflatable structures are wrapped around the first and second rollers, respectively. The motor is coupled to the first and second rollers such that the motor is operable to rotate the first and second rollers to unwrap the first inflatable structure from the first and second rollers. The gearset couples the motor to the first and second rollers.

In one example, the solar panel system further includes a motor control module and a compressor control module. The motor control module is configured to control the motor to rotate the first roller and thereby unwrap the first inflatable structure from the first roller when a speed of the vehicle is less than or equal to a predetermined speed. The compressor control module is configured to control the compressor to inflate the first inflatable structure when the first inflatable structure is unwrapped from the first roller.

In one example, after the first inflatable structure is deployed, the motor control module is configured to control the motor to rotate the first roller and thereby adjust a first angle of the first inflatable structure relative to an exterior roof of the vehicle within a first plane that extends in a longitudinal direction of the vehicle.

In one example, the solar panel system further includes a linear actuator and a linear actuator control module. The linear actuator is coupled to a first end of the first roller. The linear actuator control module is configured to control the linear actuator to adjust a height of the first end relative to a height of a second end of the first roller opposite of the first end, and thereby adjust a second angle of the first inflatable structure relative to the exterior roof of the vehicle within a second plane that extends in a lateral direction of the vehicle.

In one example, the motor control module and the linear actuator control module are configured to adjust the first and second angles, respectively, based on a solar angle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a perspective view of a first inflatable system according to the present disclosure, where the first inflatable system is shown in an uninflated state;

FIG. 1B is a section view of the first inflatable system of FIG. 1A taken along a line 1B-1B shown in FIG. 1A, where the first inflatable system is shown in the uninflated state;

FIG. 2A is a perspective view of the first inflatable system of FIG. 1A shown in an inflated state;

FIG. 2B is a section view of the first inflatable system of FIG. 1A taken along a line 2B-2B shown in FIG. 2A, where the first inflatable system is shown in the inflated state;

FIG. 3A is a section view of a second inflatable system according to the present disclosure, where the second inflatable system is shown in an uninflated state;

FIG. 3B is a section view of the second inflatable system of FIG. 3A shown in an inflated state;

FIG. 3C is a section view of a third inflatable system according to the present disclosure, where the third inflatable system is shown in an uninflated state;

FIG. 4A is a section view of a fourth inflatable system according to the present disclosure, where the fourth inflatable system is shown in an uninflated state;

FIG. 4B is a section view of the fourth inflatable system of FIG. 4A shown in an inflated state;

FIG. 5A is a section view of a fifth inflatable system according to the present disclosure, where the fifth inflatable system is shown in an uninflated state;

FIG. 5B is a section view of the fifth inflatable system of FIG. 5A shown in an inflated state;

FIG. 6A is a section view of a sixth inflatable system according to the present disclosure, where the sixth inflatable system is shown in an uninflated state;

FIG. 6B is a section view of the sixth inflatable system of FIG. 6A shown in an inflated state;

FIG. 9 is a section view of a vehicle seat according to the prior art, where the vehicle seat is shown upright;

FIG. 10 is a section view of the vehicle seat of FIG. 9 shown in a first stowed position;

FIG. 11 is a section view of the vehicle seat of FIG. 9 shown in a second stowed position;

FIG. 12 is a section view of a vehicle seat according to the present disclosure, where the vehicle seat is shown upright;

FIG. 13 is a section view of the vehicle seat of FIG. 12 shown in the first stowed position;

FIG. 14 is a section view of the vehicle seat of FIG. 12 shown in the second stowed position;

In the drawings, reference numbers may be reused to identify similar and/or identical elements.

DETAILED DESCRIPTION

Figure 7:
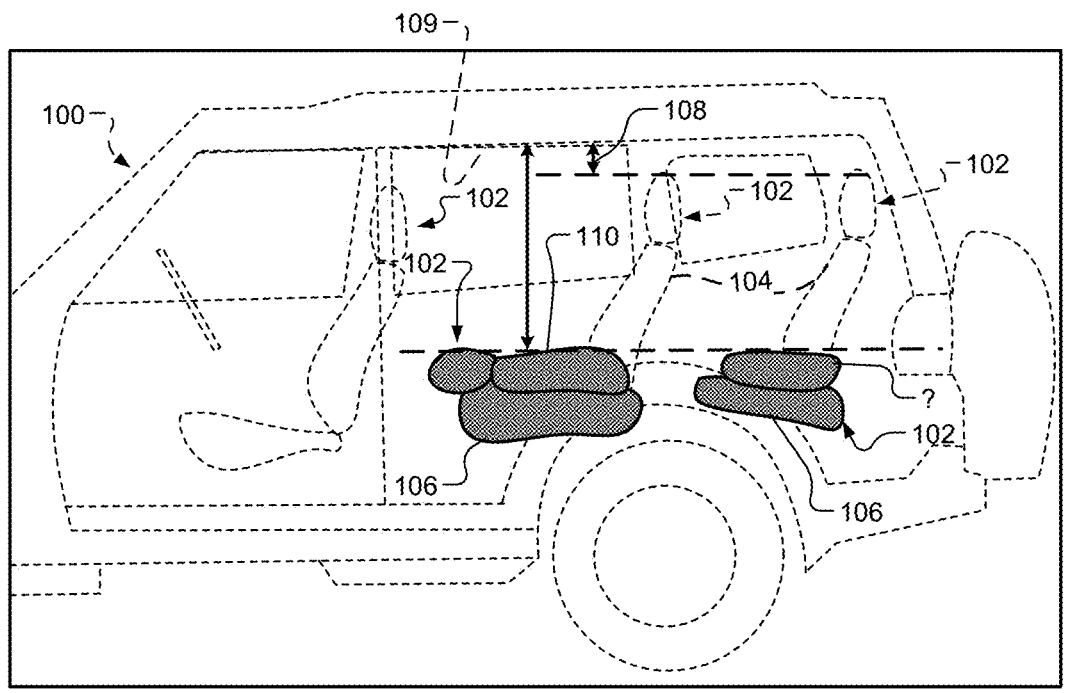
FIG. 7 is a section view of a vehicle including collapsible vehicle seats according to the prior art.

An internally tensioned inflatable structure according to the present disclosure includes a bladder and a plurality of tethers that are attached to opposite internal surfaces of the bladder. Various aspects of the tethers are varied in a plane that is parallel to the internal surfaces of the bladder to achieve a desired surface contour of the bladder, adjust the reaction force of the inflatable structure, and/or achieve a desired load carrying capacity. In one example, the length of the tethers is varied in the plane to adjust the contour of the exterior surfaces of the bladder constrained by the tethers when the bladder is inflated. In another example, the spacing between the tethers is varied in the plane to customize the reaction force of the inflatable structure at certain regions on the exterior surfaces. In another example, the angles between the tethers and the internal surfaces of the bladder are varied in the plane to adjust the curvature of the exterior surfaces and achieve a desired load carrying capacity. In another example, the stiffness of the tethers is varied in the plane to customize the reaction force of the inflatable structure and adjust the contour of the exterior surfaces of the bladder when the bladder is inflated.

An internally tensioned inflatable structure according to the present disclosure may be incorporated into various components of a vehicle. In one example, a vehicle seat according to the present disclosure includes a seat back and a seat bottom that each include a foam cushion and an internally tensioned inflatable structure according to the present disclosure attached to the foam cushion. The inflatable structure is configured to be disposed between the foam cushion and a passenger in the vehicle seat. The inflatable structure is inflated when the vehicle seat is upright to provide comfort for the passenger, and the inflatable structure is deflated when the vehicle seat is stowed to decrease the volume of the vehicle seat.

In another example, a solar panel system according to the present disclosure includes a roller, an inflatable structure according to the present disclosure wrapped around the roller, an electric motor coupled to the roller, and a compressor. The roller is mounted to an exterior wall of a vehicle such as a roof of the vehicle. The motor is operable to rotate the roller and thereby unwrap the inflatable structure from the roller or wrap the inflatable structure onto the roller. The compressor is operable to inflate or deflate the inflatable structure. The inflatable structure includes a film of photovoltaic material that forms one or more exterior surfaces of the inflatable structure. Thus, the inflatable structures may be referred to as solar panels.

To deploy the solar panels, the motor unwraps the solar panels from the rollers and the compressor inflates the solar panels. To stow the solar panels, the motor wraps the solar panels onto the rollers and the compressor deflates the solar panels. In one example, the compressor deflates the solar panels by not running, which allows air to escape the solar panels through a vent in the compressor.

Although the present disclosure provides examples in which inflatable structures according to the present disclosure are incorporated into a component of a vehicle, the inflatable structures may be incorporated into non-vehicle components. For example, the inflatable structures may be incorporated into furniture (e.g., chairs, couches, ottomans, etc.), mattresses, floors, walls, or exercise equipment (e.g., benches, matts, pads, etc.).

Referring now to FIGS. 1A, 1B, 2A, and 2B, an internally tensioned inflatable system 10 includes a bladder 12, a nozzle or valve 14 extending through the bladder 12, and a plurality of tethers 16 disposed within the bladder 12. The bladder 12 is configured to hold pressurized fluid. The valve 14 is configured to allow fluid to enter and exit the bladder 12 when the valve 14 is open. The tethers 16 are configured to limit expansion of the bladder 12 when the bladder 12 is inflated. In addition, the tethers 16 increase the amount of compressive force that the bladder 12 may withstand before the bladder 12 deforms in response to the compressive force. Further, the tethers 16 may cause the bladder 12 to have a non-flat surface contour when the bladder 12 is inflated.

The bladder 12 has a top wall 18, a bottom wall 20, and sidewalls 22 disposed between the top and bottom walls 18 and 20 around perimeter edges 24 thereof. The tethers 16 extend between the top and bottom walls 18 and 20 and are connected to the top and bottom walls 18 and 20 using, for example, three-dimensional (3D) knitting, weft knitting, hand stitching, an embroidering machine, and/or a clothing tag installation device. The valve 14 is shown extending through the top wall 18 of the bladder 12. However, the valve 14 may extend through the bottom wall 20 of the bladder 12 or the sidewalls 22 of the bladder 12.

The bladder 12 is configured to contain fluid such as a gas (e.g., air) or a liquid. The bladder 12 may be made from a thin layer of material such as thermoplastic polyurethane (TPU) or silicone coated fabric (nylon, polyester, Kevlar, etc.). The thickness of the bladder 12 may vary from 0.1 millimeters (mm) to 10 mm depending on the pressure range of the bladder 12.

The bladder 12 prevents fluid from entering or exiting the bladder 12 except for through the valve 14. As noted above, the valve 14 is configured to allow fluid to enter and exit the bladder 12 when the valve 14 is open. In one example, the valve 14 includes a seal that normally closes the valve 14, and a hose needle (not shown) is inserted into the valve 14 and through the seal to inflate or deflate the bladder 12.

The tethers 16 may include monofilament threads, such as wires, and/or multifilament threads, such as yarn. Additionally or alternatively, the tethers 16 may include cables and/or ribbons (or tapes). The tethers 16 may have cross-sectional shapes that are circular, star-shaped, and/or rectangular.

In FIGS. 1A and 1B, the bladder 12 is shown in an uninflated state. In the inflated state, the top and bottom walls 18 and 20 of the bladder 12 are separated by a first distance 26. In FIGS. 2A and 2B, the bladder 12 is shown in an inflated state. In the inflated state, the top and bottom walls 18 and 20 of the bladder 12 are separated by a second distance 28. The second distance 28 is greater than the first distance 26. As the bladder 12 is inflated, the top and bottom walls 18 and 20 of the bladder 12 move outward in first and second directions 30 and 32, respectively, and the sidewalls 22 deform inward in third and fourth directions 34 and 36.

Various aspects of the tethers 16 may be adjusted to achieve a desired surface contour of the bladder 12, adjust the reaction force of the inflatable system 10 at a certain region on the surface of the bladder 12, and/or achieve a desired load carrying capacity. In one example, the length of the tethers 16 is varied in a first plane 38 to adjust the contour of exterior surfaces 44 of the bladder 12 when the bladder 12 is inflated. The first plane 38 extends a fifth direction 40 and a sixth direction 42. In another example, the spacing between the tethers 16 is varied in the first plane 38 to customize the reaction force of the inflatable system 10 at certain regions on the exterior surfaces 44. In another example, the angles between the tethers 16 and the top or bottom walls 18 or 20 are varied in the first plane 38 to adjust the curvature of the exterior surfaces 44 and achieve a desired load carrying capacity. In another example, the stiffness of the tethers 16 is varied in the first plane 38 to customize the reaction force of the inflatable system 10 and adjust the contour of the exterior surfaces 44 of the bladder 12 when the bladder 12 is inflated.

In the example shown in FIGS. 1A, 1B, 2A, and 2B, all of the tethers 16 have the same length and the same angle (90 degrees) with respect to the top and bottom walls 18 and 20. In addition, the spacing between the tethers 16 is fixed or constant in the first plane 38, and all the tethers 16 are made from the same stiffness. Thus, the contour of the exterior surfaces 44 of the bladder 12 is flat. In addition, the reaction force and load carrying capacity of the inflatable system 10 is constant across the exterior surfaces 44 of the bladder 12.

Referring now to FIGS. 3A and 3B, an internally tensioned inflatable system 50 is similar or identical to the inflatable system 10 except that the length of the tethers 16 is varied in the first plane 38. In FIG. 3A, the inflatable system 50 is shown in an uninflated (or stowed) state. In FIG. 3B, inflatable system 50 is shown in an inflated (or deployed) state. Although the valve 14 is not shown in FIGS. 3A and 3B and other figures in this application, the inflatable system 50 and other internally tensioned inflatable systems described in this application may include the valve 14.

The length of the tethers 16 is varied in proportion to the distance between the tethers 16 and a second plane 52 in the fifth direction 40. The second plane 52 is disposed midway between the sidewalls 22. In addition to or instead of varying the length of the tethers 16 in the fifth direction 40, the length of the tethers 16 may be varied in other directions in the first plane 38 such as the sixth direction 42. In one example, the tethers 16 include a first tether 16-1, a second tether 16-2, a third tether 16-3, and a fourth tether 16-4. Each of the first and second tethers 16-1 and 16-2 are located a first distance 54 from the second plane 52 in the first direction 40. Each of the third and fourth tethers 16-3 and 16-4 are located a second distance 56 from the second plane 52 in the first direction 40. Each distance from the second plane 52 in the first direction 40 may be considered a region. Thus, the first and second tethers 16-1 and 16-2 may be disposed within one region, and the third and fourth tethers 16-3 and 16-4 may be disposed within another region.

The contour of the exterior surfaces 44 on the top and bottom walls 18 and 20 is symmetric with respect to the second plane 52. In addition, since there are no external constraints placed on the bladder 12, the top and bottom walls 18 and 20 expand outward in the first and second directions 30 and 32 by the same amount. Thus, the contour of the exterior surfaces 44 of the bladder 12 is symmetric with respect to a third plane 58 disposed midway between the top and bottom walls 18 and 20. In other words, the contour of the exterior surface 44 on the top wall 18 is similar or identical to the contour of the exterior surface 44 on the bottom wall 20.

Referring now to FIG. 3C, internally tensioned inflatable system 60 is similar or identical to the inflatable system 50 except that the inflatable system 60 includes a rigid bottom plate 62. The inflatable system 60 is shown in an inflated state. The bottom plate 62 constrains or prevents the bottom wall 20 from expanding outward in the second direction 32. The contours of exterior surfaces 44 of the bladder 12 are asymmetric with respect to the third plane 58. For example, the exterior surface 44 of the top wall 18 has a wavy or non-flat contour, while the exterior surface 44 of the bottom wall 20 has a flat contour. In addition, while not necessarily illustrated in FIG. 3C, the amount by which the top wall 18 expands in the first direction 30 is greater in the inflatable system 60 than in the inflatable system 50 since all of the expansion occurs in the first direction 30. However, the contour of the exterior surface 44 of the top wall 18 is the same for both inflatable systems 50, 60.

The bottom plate 62 may be made from a rigid material such as stainless steel, aluminum, and/or acrylonitrile butadiene styrene. The bottom plate 62 can be a soleplate or can have internal structure like honeycomb to improve the stiffness of the bottom plate 62. The thickness of the bottom plate 62 (i.e., the dimension of the bottom plate 62 in the first and second directions 30 and 32) may be selected based on the material of the bottom plate 62, the internal structure or curvature of the bottom plate 62, and/or the operating pressure of the bladder 12. In one example, the thickness of the bottom plate 62 is within a range from 0.1 mm to 20 mm.

Referring now to FIGS. 4A and 4B, an internally tensioned inflatable system 70 is similar or identical to the inflatable system 60 except that the length of the tethers 16 is fixed or constant in the fifth direction 40. In addition, the stiffness of the tethers 16 is varied in the fifth direction 40 by, for example, varying the material, weave, and/or cross-sectional area of the tethers 16 in the fifth direction 40. In addition to or instead of varying the stiffness of the tethers 16 in the fifth direction 40, the stiffness of the tethers 16 may be varied in other directions in the first plane 38 (FIG. 2A) such as the sixth direction 42. In FIG. 4A, the inflatable system 70 is shown in an uninflated state. In FIG. 4B, the inflatable system 70 is shown in an inflated state. Also, in FIG. 4B, it appears that the spacing between tethers 16 in the fifth direction 40 within the first region 72 is less than the spacing between the tethers 16 and the fifth direction 40 within the second region 74. However, the spacing between the tethers 16 in the fifth direction 40 may be fixed or constant throughout the first and second region 72, and the discussion below would still apply.

The tethers 16 are arranged in a first region 72 and a second region 74. The first region 72 includes a first sub region 76 disposed adjacent to one of the sidewalls of 22 and a second sub region 78 disposed adjacent to the other one of the sidewalls 22. The second region 74 is disposed between the first and second sub regions 76 and 78.

The tethers 16 in the first region 72 have a first stiffness, and the tethers 16 in the second region 74 have a second stiffness. The second stiffness is greater than the first stiffness. Thus, when the bladder 12 is inflated, the tethers 16 in the first region 72 stretch more than the tethers 16 in the second region 74, and the top wall 18 expands outward in the first direction 30 by a greater degree in the first region 72 compared to the second region 74. In addition, when an external force is applied to the top wall 18 in the second direction 32, the amount by which the top wall 18 deforms in the second direction 32 until the tethers 16 buckle may be greater in the first region 72 as compared to the second region 74.

As can be appreciated, the tethers 16 in the first region 72 may not all have the same stiffness, and the tethers 16 in the second region 74 may not all have the same stiffness. Rather, the stiffness of the tethers 16 in the first and second regions 72 and 74 may vary in a continuous manner in the fifth direction 40 to produce the wavy contour of the exterior surface 44 on the top wall 18. Nonetheless, the stiffness of all of the tethers 16 in the second region 74 may be greater than the stiffness of all of the tethers 16 in the first region 72.

In one variation of the inflatable system 70, the tethers 16 in the first region 72 may have a first length, and the tethers 16 in the second region 74 may have a second length that is greater than the first length. The length of the tethers 16 is the dimension of the tethers 16 in the first and second directions 30 and 32. In one example, the first length may be 2 inches, and the second length may be 3 inches.

The difference between the first and second lengths may offset the difference in the expansion of the tethers 16 in the first and second region 72 and 74 caused by the difference between the stiffness of the tethers 16 in the first and second regions 72 and 74. As a result, the exterior surface 44 of the top wall 18 may be relatively flat. However, the inflatable system 70 may yield different reaction forces in the first and second region 72 and 74 when an external force is applied in the second direction 32. For example, if a person were to apply a force to the top wall 18 in the second direction 32, the top wall 18 may feel more compliant in the first region 72 and more stiff in the second region 74.

Referring now to FIGS. 5A and 5B, an internally tensioned inflatable system 80 is similar or identical to the inflatable system 50 of FIGS. 3A and 3B except that the length of the tethers 16 is fixed or constant in the fifth direction 40. In addition, that angle between the tethers 16 and the top wall 18 is varied in the fifth direction 40. In addition to or instead of varying the angle between the tethers 16 and the top wall 18 in the fifth direction 40, the angle between the tethers 16 and the top wall 18 may be varied in other directions in the first plane 38 (FIG. 2A) such as the sixth direction 42. In FIG. 5A, the inflatable system is shown in an uninflated state. In FIG. 5B, the inflatable system 80 is shown in an inflated state.

The tethers 16 in the first region 72 form a first angle 82 with the top wall 18, and the tethers 16 in the second region 74 form a second angle 84 with the top wall 18. The first and second angles 82 and 84 are measured on the sides of the tethers 16 closest to the second plane 52. When the top and bottom walls 18 and 20 are flat, such as when the inflatable system 80 is uninflated, the first angle 82 is a right angle, and the second angle 84 is an acute angle. However, when the inflatable system 80 is inflated, the tethers 16 in the first and second regions 72 and 74 have a tendency to project in an orthogonal direction relative to the top and bottom walls 18 and 20. Thus, when the inflatable system 80 is inflated, the bladder 12 forms a bend 85 at the second plane 52 such that the exterior surface 44 of the top wall 18 has a concave contour, and the exterior surface 44 of the bottom wall 20 has a convex contour. The bend 85 is formed due to the difference between the first and second angles 82 and 84.

As can be appreciated, the tethers 16 in the first region 72 may not all form the same angle with the top wall 18, and the tethers 16 in the second region 74 may not all form the same region with the top wall 18. In the example shown, all of the tethers 16 in the first region 72 form a right angle with the top wall 18, and the angles formed between the tethers 16 and the top wall 18 in the second region 74 gradually decrease from a right angle in the fifth direction 40 toward the second plane 52. In addition, the angles formed between the tethers 16 and the top wall 18 in the second region 74 are symmetrical with respect to the second plane 52. Thus, the bend 85 in the bladder 12 is gradual and symmetric with respect to the second plane 52.

Although the discussion above focuses on the angle formed between the tethers 16 and the top wall 18, the angle(s) formed between the tethers 16 and the bottom wall 20 in the first region 72 may be different than the angle(s) formed between the tethers 16 and the bottom wall 20 in the second region 74. In the inflatable system 80, the tethers 16 in the first region 72 form a third angle 86 with the bottom wall 20, and the tethers 16 in the second region 74 form a fourth angle 88 with the bottom wall 20. The third and fourth angles 86 and 88 are measured on the sides of the tethers 16 closest to the second plane 52. When the top and bottom walls 18 and 20 are flat, such as when the inflatable system 80 is uninflated, the third angle 86 is a right angle, and the fourth angle 88 is an obtuse angle.

Referring now to FIGS. 6A and 6B, an internally tensioned inflatable system 90 is similar or identical to the inflatable system 60 except that the length of the tethers 16 is fixed or constant in the fifth direction 40. In addition, the spacing between the tethers 16 is varied in the fifth direction 40. In FIG. 6A, the inflatable system 90 is shown in an uninflated state. In FIG. 6B, the inflatable system 90 is shown in an inflated state.

The tethers 16 in the first region 72 are spaced apart by a first distance 92 in the fifth direction 40, and tethers 16 in the second region 74 are spaced apart by a second distance 94 in the fifth direction 40. The second distance 94 is greater than the first distance 92. Thus, the number of the tethers 16 within a fixed length 96 in the fifth direction 40 is greater in the first region 72 than in the second region 74.

The tethers 16 in the first region 72 may be spaced apart by the first distance 92 in all directions of the first plane 38 (FIG. 2A), and the tethers 16 in the second region 74 may be spaced apart by the second distance 94 in all directions of the first plane 38. Thus, the density of the tethers 16 per unit area in the first region 72 may be greater than the density of the tethers 16 per unit area and the second region 74. Since the tethers 16 counteract compression loads, a greater number of the tethers 16 per unit area yields a greater reaction force to compression loads. Conversely, a lesser number of the tethers 16 per unit area yields a lesser reaction force to compression loads. This is at least partly due to the fact that compression loads applied between the tethers 16 caused the tethers 16 to buckle sooner.

Referring now to FIG. 7, a vehicle 100 is shown with seats 102 according to the prior art. Each of the seats 102 includes a seat back 104 and a seat bottom 106. Each of the seat back 104 and the seat bottom 106 includes a cushion that is entirely made up of conventional seat cushion material such as foam. Each of the seats 102 is adjustable between an upright position, shown in phantom, and a collapsed or stowed position, shown in solid. When the seats 102 are upright, the topmost surface of the seats 102 is located a first distance 108 from a roof 109 of the vehicle 100. When the seats 102 are collapsed, the topmost surface of the seats 102 are located a second distance 110 from the roof 109. The second distance 110 is greater than the first distance 108. Thus, the vehicle 100 has more interior space when the seats 102 are collapsed relative to when the seats 102 are upright.

Figure 8:
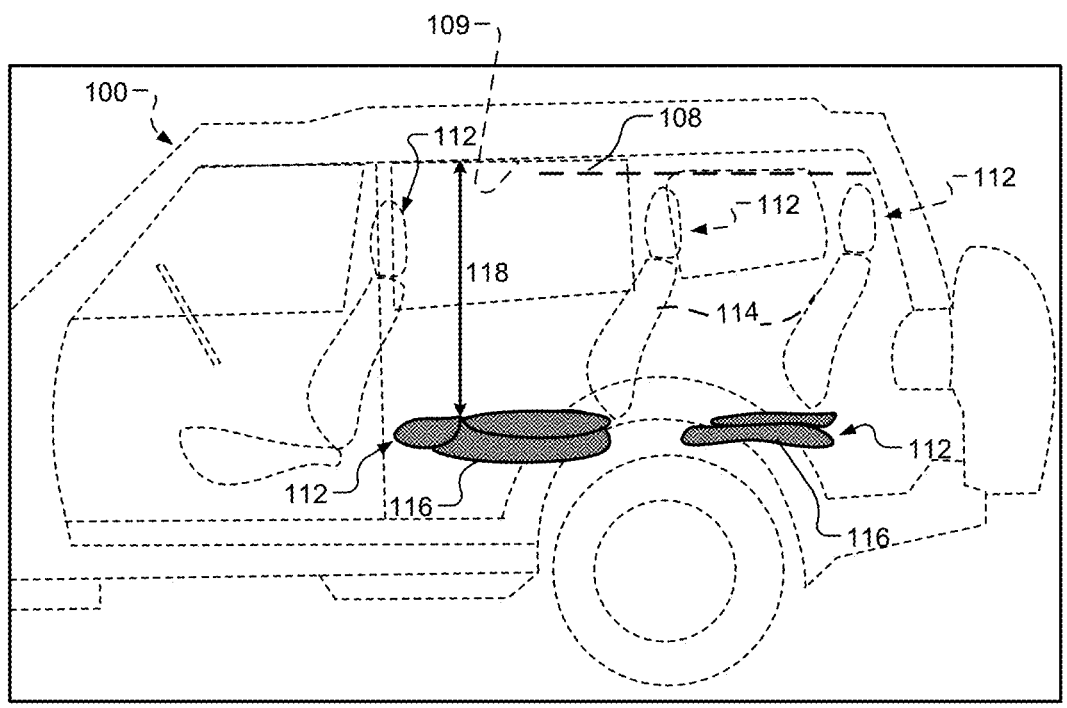
FIG. 8 is a section view of a vehicle including collapsible vehicle seats according to the present disclosure.

Referring now to FIG. 8, the vehicle 100 is shown with seats 112 according to the present disclosure. Like the seats 102, each of the seats 112 includes a seat back 114 and a seat bottom 116. However, in contrast to the seats 102, each of the seat back 104 and the seat bottom 106 includes a cushion that is only partially made up of conventional seat cushion material. The remainder of the seat back 104 and the seat bottom 106 is made up of an internally tensioned inflatable system such as those described above. The inflatable system is inflated when the seats 112 are upright, and the inflatable system is deflated when the seats 112 are stowed.

As with the seats 102, the topmost surface of the seats 112 is located the first distance 108 from the roof 109 of the vehicle 100 when the seats 102 are upright. However, in contrast to the seats 102, the topmost surface of the seats 112 are located a third distance 118 from the roof 109 when the seats 102 are stowed. The third distance 118 is greater than the second distance 110 since the inflatable system is deflated when the seats 112 are stowed. Thus, the vehicle 100 has even more interior space when the seats 112 are stowed as compared to the amount of interior space that the vehicle 100 has when the seats 102 are stowed.

The vehicle 100 may include a valve control module (not shown) that opens a valve of the inflatable system in the seats 112 when the seats 112 are stowed. The valve control module may determine when the seats 112 are stowed based on an input from a seat position sensor coupled to the seats 112. In addition, the vehicle 100 may include a compressor (not shown) in fluid communication with the inflatable system, and a compressor control module (not shown) that controls the compressor to inflate the inflatable system when the seats 112 are upright.

Referring now to FIGS. 9-11, the seat 102 according to the prior art is shown in various positions. In FIG. 9, the seat 102 is shown in an upright position. The seat 102 includes a hinge 120 that pivotally connects the seat back 104 to the seat bottom 106. FIGS. 10 and 11 illustrate different stowed positions that the seat 102 may assume. When the seat 102 is collapsed from the upright position shown in FIG. 9 to the stowed position shown in FIG. 10, the seat bottom 106 remains stationary while the seat back 104 pivots toward the seat bottom 106 about the hinge 120. When the seat 102 is collapsed from the upright position shown in FIG. 9 to the stowed position shown in FIG. 11, the seat back 104 remains stationary while the seat bottom 106 pivots toward the seat back 104 about the hinge 120.

Referring now to FIGS. 12-14, the seat 112 according to the present disclosure is shown in various positions. In FIG. 12, the seat 112 is shown in an upright position. The seat 112 includes a hinge 122 that pivotally connects the seat back 114 to the seat bottom 116. The seat back 114 includes a first foam cushion 124 and a first inflatable system 126. The seat bottom 116 includes a second foam cushion 128 and a second inflatable system 130. The first and second inflatable systems 126 and 130 may be similar or identical to any of the inflatable systems described herein.

In the example shown, the first inflatable system 126 is configured to be disposed between an occupant in the seat 112 and the first foam cushion 124. Similarly, the second inflatable system 130 is configured to be disposed between the occupant and the second foam 128. In other examples, the first foam cushion 124 is configured to be disposed between the occupant and the first inflatable system 126, and the second foam cushion 128 is configured to be disposed between the occupant and the second inflatable system 130.

FIGS. 13 and 14 illustrate different stowed positions that the seat 112 may assume. When the seat 112 is collapsed from the upright position shown in FIG. 12 to the stowed position shown in FIG. 13, the seat bottom 116 remains stationary while the seat back 114 pivots toward the seat bottom 116 about the hinge 122. When the seat 112 is collapsed from the upright position shown in FIG. 12 to the stowed position shown in FIG. 14, the seat back 114 remains stationary while the seat bottom 116 pivots toward the seat back 114 about the hinge 122.

When the seat 112 is upright, the first and second inflatable systems 126 and 130 are inflated. Thus, the first inflatable system 126 has a first thickness 132, and the second inflatable system 130 has a second thickness 134. When the seat 112 is stowed, the first and second inflatable systems 126 and 130 are deflated. Thus, the thickness of the first and second inflatable systems 126 and 130 is zero or near zero. Therefore, the seat 112 takes up less space in the stowed position shown in FIG. 13 relative to the amount of space taken up by the seat 102 in the stowed position shown in FIG. 10. Similarly, the seat 112 takes up less space in the stowed position shown in FIG. 14 relative to the amount of space taken up by the seat 102 in the stowed position shown in FIG. 11.

When the seat 102 according to the prior art is in the stowed position shown in FIG. 10, the seat 102 has a first height 136. When the seat 112 according to the present disclosure is in the stowed position shown in FIG. 13, the seat 112 has a second height 138. The second height 138 is less than the first height 136. The difference between the first and second heights 136 and 138 of the seats 102, 112 illustrates the amount of space that may be saved by deflating the first and second inflatable systems 126 and 130.

Figure 16:
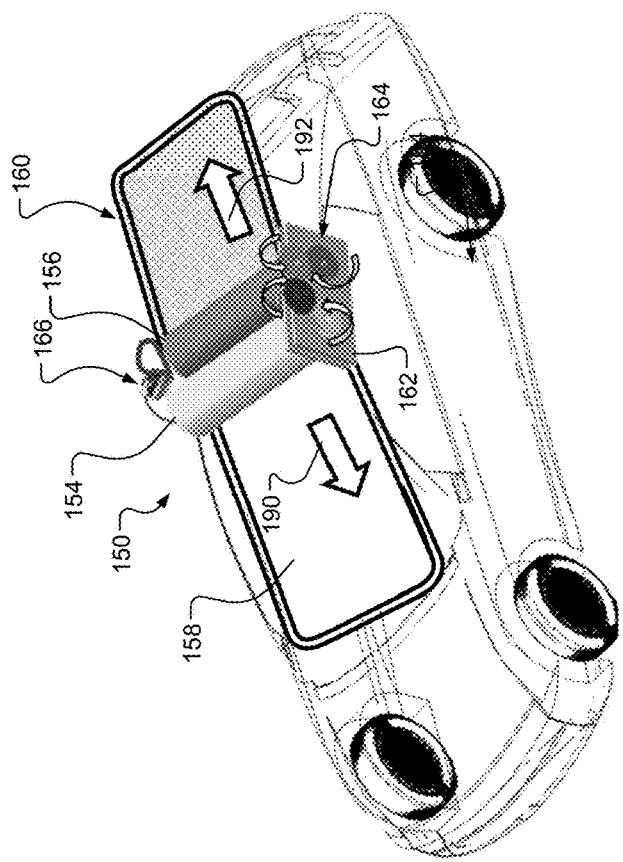
FIG. 16 is a perspective view of the vehicle of FIG. 15 with the first solar panel system shown in a deployed position.
Figure 15:
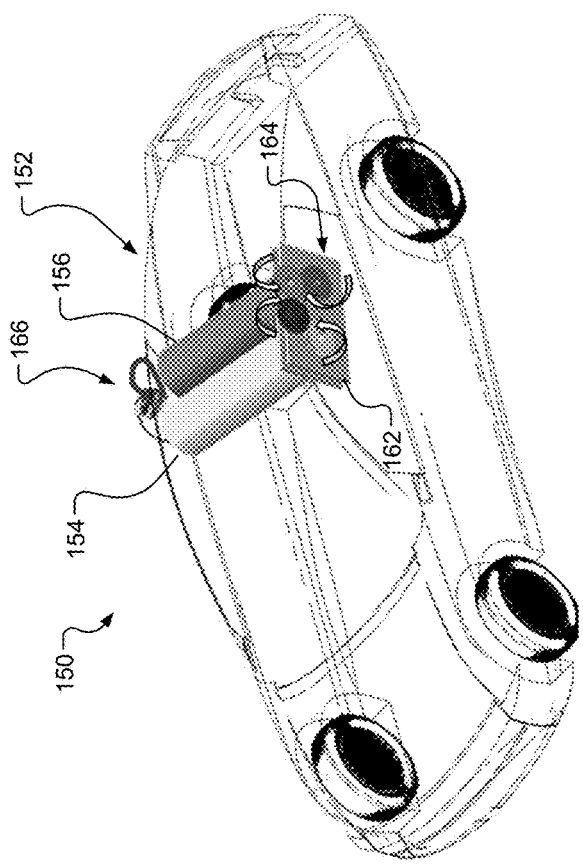
FIG. 15 is a perspective view of a vehicle including a first solar panel system according to the present disclosure, where the first solar panel system is shown in a stored position.

Referring now to FIGS. 15 and 16, a vehicle 150 includes a solar panel system 152 that can be stowed (FIG. 15) or deployed (FIG. 16). The solar panel system 152 includes a first roller 154, a second roller 156, a first inflatable structure 158, a second inflatable structure 160, a mounting plate 162, a gear set 164, and a compressor 166. The first and second inflatable structures 158 and 160 are wrapped around the first and second rollers 154 and 156, respectively, when the solar panel system 122 is stowed. Thus, the first and second inflatable structures 158 and 160 may be made from materials that are one or more of thin, foldable, and flexible to enable wrapping the first and second inflatable structures 158 and 160 around the first and second rollers 154 and 156.

The mounting plate 162 attaches the first and second rollers 154 and 156 to an exterior wall of the vehicle 150, such as a roof panel 167 of the vehicle 150, while allowing the first and second rollers 154 and 156 to rotate relative to the mounting plate 162. The gear set 164 couples the first and second rollers 154 and 156 to one another such that rotating one of the first and second rollers 154 and 156 causes the other one of the first and second rollers 154 and 156 to rotate. The compressor 166 is in fluid communication with the first and second inflatable structures 158 and 160 and is operable to inflate the first and second inflatable structures 158 and 160. In addition, the compressor 166 may include an electronically controlled valve that is adjustable to an open position to deflate the first and second inflatable structures 150 and 160.

Figure 17:
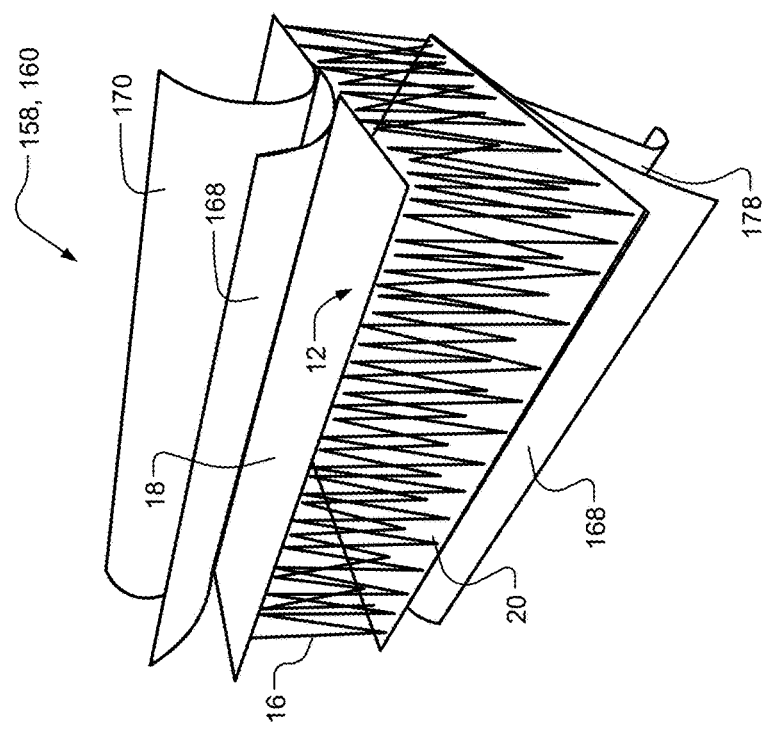
FIG. 17 is a perspective view of an inflatable structure in the first solar panel system of FIG. 16 with portions of the inflatable structure removed to reveal interior elements.

With additional reference to FIG. 17, each of the first and second inflatable structures 158 and 160 may include any of the internal intention inflatable systems described herein. Each of the first and second inflatable structures 158 and 160 includes the bladder 12 and the tether 16 extending between and attached (e.g., stitched) to the top and bottom walls 18 and 20 of the bladder 12. FIG. 17 illustrates only a portion of the first and second inflatable structures 158 and 160. Thus, while certain elements of the inflatable systems described herein are not shown, such as the valve 14 or the sidewalls 22, each of the first and second inflatable structures 158 and 160 may also include these elements. The compressor 166 may inflate and/or deflate the first and second structures 158 and 160 through the valve 14.

Each of the first and second inflatable structures 158 and 160 may further include one or more additional bladder layers 168, and a film 170 of photovoltaic material. The bladder layers 168 may be included to ensure that the bladder 12 remains sealed when the solar panel system 152 is deployed. The bladder layers 168 may be made from one or more of the materials from which the bladder 12 may be made, and the thickness of the bladder layers 168 may fall within the thickness range provided above for the bladder 12. Nonetheless, the bladder layers 168 may be made from a different material than the bladder 12, and the thickness of each of the bladder layers 168 may be different than the thickness of the bladder 12.

The film 170 forms the exterior surfaces of the first and second inflatable structures 158 and 160. The film 170 is operable to convert sunlight into electricity. Thus, the first and second inflatable structures 158 and 160 may be referred to as solar panels. The film 170 may be attached to the bladder layers 168 and/or directly to the bladder 12 using, for example, adhesive.

Figure 18:
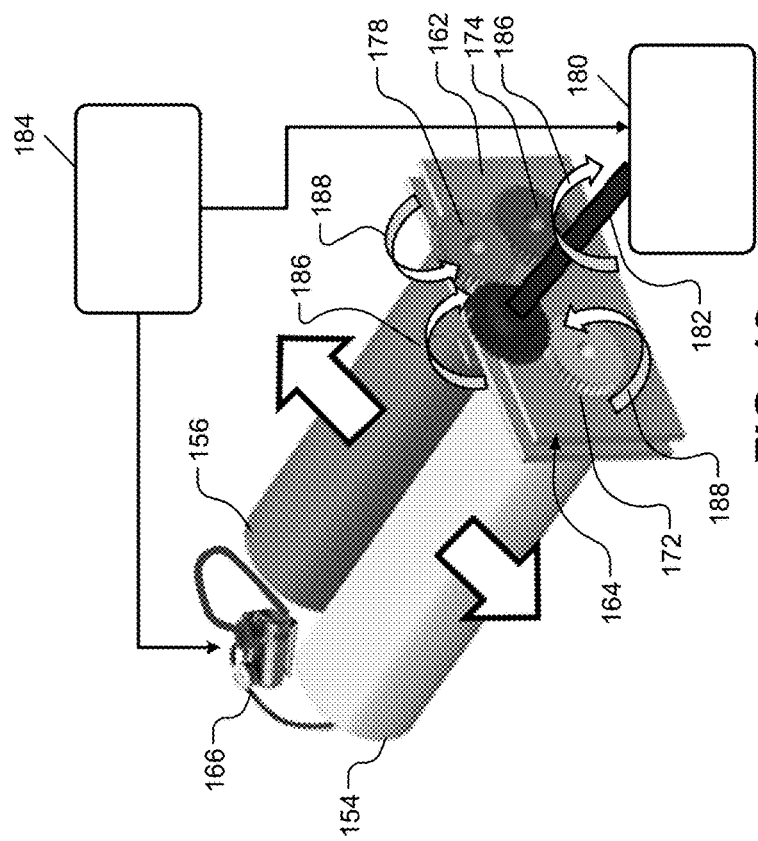
FIG. 18 is an enlarged perspective view of the first solar panel system of FIG. 16 showing additional elements of the first solar panel system.

With additional reference to FIG. 18, the gear set 164 includes a first gear 172, a second gear 174, a third gear 176, and a fourth gear 178. The first gear 172 is fixed to the first roller 154 such that the first roller 154 and the first gear 172 rotate with one another. Similarly, the second gear 174 is fixed to the second roller 156 such that the second roller 156 and the second gear 174 rotate with one another. The first and second gears 172 and 174 are fixed to the first and second rollers 154 and 156, respectively, through the mounting plate 162. The mounting plate 162 may include bearings disposed about the connections between the gears 172, 174 and the rollers 154, 156 to allow the gears 172, 174 and the rollers 154, 156 to rotate relative to the mounting plate 162.

The teeth of the third gear 176 are engaged with the teeth of the first gear 172, the teeth of the fourth gear 170 are engaged with the teeth of the second gear 174, and the teeth of the third and fourth gears 176 and 178 are engaged with one another. Thus, rotating any one of the gears 172-178 causes all of the other gears 172-178 to rotate. In addition, since the first and second gears 172 and 174 are fixed to the first and second rollers 154 and 156, respectively, the rollers 154, 156 rotate with the gears 172-178.

The solar panel system 152 further includes an electric motor 180, a shaft 182 that connects the motor 180 to the third gear 176, and a solar panel control module 184 that controls the compressor 166 and the motor 180. When the motor 180 rotates in a clockwise direction 186, the third gear 176 also rotates in the clockwise direction 186. In turn, the first and fourth gears 172 and 178 rotate in a counterclockwise direction 188, and the second gear 174 rotates in the clockwise direction 186. The rotation of the first and second gears 172 and 174 in the clockwise and counterclockwise directions 186 and 188 causes the first and second rollers 154 and 156 to rotate in the clockwise and counterclockwise directions 186 and 188, respectively.

Rotation of the first and second rollers 154 and 156 in the clockwise and counterclockwise directions 186 and 188 unwraps the first and second inflatable structures 158 and 160 from the first and second rollers 154 and 156, respectively. Thus, the solar panel control module 184 controls the motor 180 to rotate the shaft 182 in the clockwise direction 186 and thereby unwrap the first and second inflatable structures 158 and 160 from the first and second rollers 154 and 156, respectively. While unwrapping the first and second inflatable structures 158 and 160 from the first and second rollers 154 and 156, the solar panel control module 184 may control the compressor 166 to inflate the first and second inflatable structures 158 and 160. Inflating and unwrapping the first and second inflatable structures 158 and 160 as described above causes the first and second inflatable structures 158 and 160 to deploy in forward and rearward directions 190 and 192, respectively (FIG. 16).

When the first and second inflatable structures 158 and 160 are fully deployed as shown in FIG. 16, the film 170 converts sunlight into electricity. In addition, the first and second inflatable structures 158 and 160 shade the vehicle 150 to reduce the load on the air conditioning system of the vehicle 150. As can be appreciated, the vehicle 150 may include an electrical system that transmits electricity from the solar panel system 152 to a battery in the vehicle 150. In one example, the vehicle 150 is an electric vehicle or a hybrid electric vehicle, and the solar panel system 152 increases the distance range that the vehicle 150 may travel before charging the battery of the vehicle using an external power source.

To return the first and second inflatable structures 158 and 160 to the stowed position shown in FIG. 15, the solar panel control module 184 controls the motor 180 to rotate the shaft 182 in the counterclockwise direction 188 and thereby wrap the first and second inflatable structures 158 and 160 onto the first and second rollers 154 and 156, respectively. While wrapping the first and second inflatable structures 158 and 160 onto the first and second rollers 154 and 156, the solar panel control module 184 may command the compressor 166 to deflate the first and second inflatable structures 158 and 160. The compressor 166 may accomplish this by, for example, simply shutting off to allow air to exit the first and second inflatable structures 158 and 160 through a vent in the compressor 166. Additionally or alternatively, the compressor 166 may open a valve located therein to release air from the first and second inflatable structures 158 and 160.

Figures 19, 20:
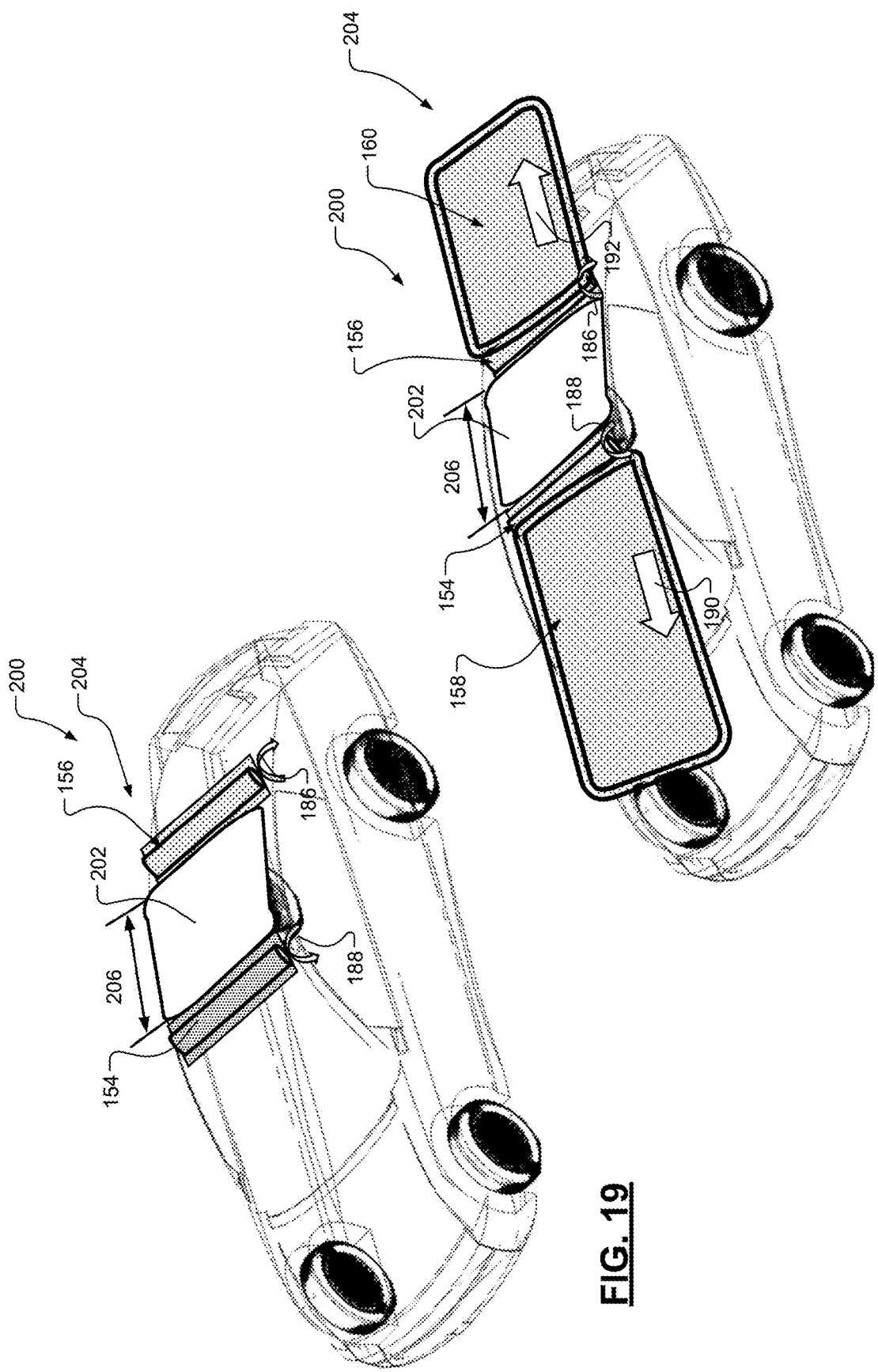
FIG. 19 is a perspective view of a vehicle including a second solar panel system according to the present disclosure, where the second solar panel system is shown in a stored position.
FIG. 20 is a perspective view of the vehicle of FIG. 19 with the second solar panel system shown in a deployed position.

Referring now to FIGS. 19 and 20, a vehicle 200 is similar to the vehicle 150 except that the vehicle 200 includes a sunroof 202 and a solar panel system 204 that is different than the solar panel system 152 to accommodate the sunroof 202. Like the solar panel system 152, the solar panel system 204 includes the first and second rollers 154 and 156 and the first and second inflatable structures 158 and 160. However, in contrast to the solar panel system 152, the first and second rollers 154 and 156 are spaced apart by a distance 206 to accommodate the sunroof 202. Thus, the first and second rollers 154 and 156 and the first and second inflatable structures 158 and 160 do not block the view of passengers in the vehicle 200 looking through the sunroof 202.

The solar panel system 204 may also include a pair of motors that each coupled to one of the first and second rollers 154 and 156. The motors may be controlled to rotate the first and second rollers 154 and 156 independent of one another. Alternatively, the solar panel system 204 may include a single motor and a coupling mechanism, such as a gear set, a belt, and/or a chain, which couples the first and second rollers 154 and 156 to one another and/or to the single motor. Thus, the first and second rollers 154 and 156 may be rotated using the single motor.

The solar panel system 204 may further include other elements of the solar panel system 152 such as the compressor 166 and the solar panel control module 184. The solar panel control module 184 may control the solar panel systems 152, 204 in the same way or at least in similar ways. For example, if the solar panel system 204 includes a pair of motors, the solar panel control module 184 may control the motors to rotate the first and second rollers 154 and 156 in the counterclockwise and clockwise directions 188 and 186, respectively.

Rotating the first and second rollers 154 and 156 in the counterclockwise and clockwise directions 188 and 186 causes the first and second inflatable structures 158 and 160 to unwrap from the first and second rollers 154 and 156. While unwrapping the first and second inflatable structures 158 and 160 from the first and second rollers 154 and 156, the solar panel control module 184 may control the compressor 166 to inflate the first and second the first and second inflatable structures 158 and 160. Inflating and unwrapping the first and second inflatable structures 158 and 160 as described above causes the first and second inflatable structures 158 and 160 to deploy in forward and rearward directions 190 and 192, respectively (FIG. 20).

Figure 21:
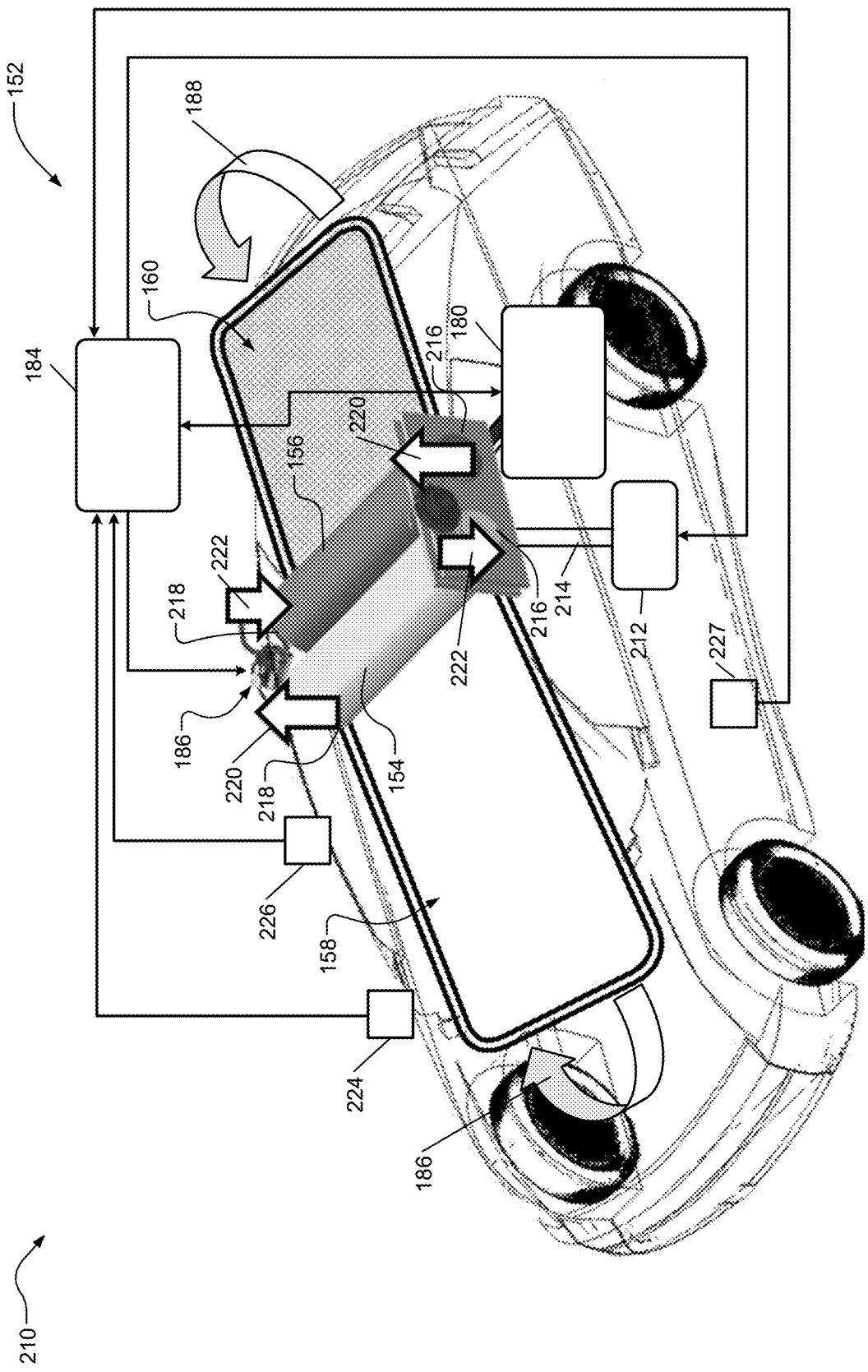
FIG. 21 is a perspective view of a vehicle including a third solar panel system according to the present disclosure, where the third solar panel system is shown in a deployed position.

Referring now to FIG. 21, a vehicle 210 is identical to the vehicle 150 except that the solar panel system 152 includes additional elements to adjust the angles of the first and second inflatable structures 158 and 160 based on the sun position to maximize solar load. For example, the solar panel system 152 includes a linear actuator 212 and a coupling mechanism 214, such as a shaft, which couples the linear actuator 212 to the mounting plate 162. The solar panel control module 184 may control the linear actuator 212 to raise or lower the mounting plate 162 and thereby raise or lower first ends 216 of the rollers 154, 156 relative to second ends 218 of the rollers 154, 156. Raising the mounting plate 162 moves the mounting plate 162 in an upward direction 220, while lowering the mounting plate 162 moves the mounting plate 162 in a downward direction 222. The mounting plate 162 may be attached to the exterior wall of the vehicle 150 using a coupling mechanism such as telescoping cylinders that allow the mounting plate 162 to move in the upward and downward directions 220 and 222 relative to the exterior wall.

The solar panel system 152 may also include a second linear actuator (not shown) that is coupled to the second ends 218 of the rollers 154, 156. The solar panel control module 184 may control the second linear actuator to move the second ends 218 of the rollers 154, 156 in the upward and downward directions 220 and 222 relative to the first ends 216 of the rollers 154, 156. Thus, the solar panel control module 184 may control the linear actuator 212 and the second linear actuator to raise and lower the first and second ends 216 and 218 of the rollers 154, 156 independent of one another. Raising or lowering the first and second ends 216 and 218 of the rollers 154, 156 relative to one another adjusts the tilt angles of the first and second inflatable structures 158 and 160.

In addition to adjusting the tilt angles of the first and second inflatable structures 158 and 160, the solar panel control module 184 may rotate the first and second inflatable structures 158 and 160 in the clockwise and counterclockwise directions 186 and 188. The solar panel control module 184 may accomplish this by rotating the first and second rollers 154 and 156 in the clockwise and counterclockwise directions 186 and 188 when the first and second inflatable structures 158 and 160 are fully deployed.

In one variation, the solar panel system 152 may include a pair of motors in place of the motor 180, and each of the motors may be directly coupled to one of the first and second rollers 154 and 156. The solar panel control module 184 may control the motors to rotate the first and second rollers 154 and 156 in the clockwise and counterclockwise directions 186 and 188 independent of one another. Thus, the solar panel control module 184 may control the motors to adjust the rotational angles of the first and second inflatable structures 158 and 160 in the clockwise and counterclockwise directions 186 and 188 independent of one another.

The solar panel system 152 may further include one or more solar angle sensors 224, a global positioning system (GPS) receiver 226, and/or a vehicle speed sensor 227. The solar angle sensors 224 detect one or more solar angles (i.e., one or more angles of sunlight). The GPS receiver 226 receives information from GPS satellites and determines the location of the vehicle 210 based on the information. The information may include the current time of day. The vehicle speed sensor 227 measures the speed of the vehicle 210.

Figure 22:
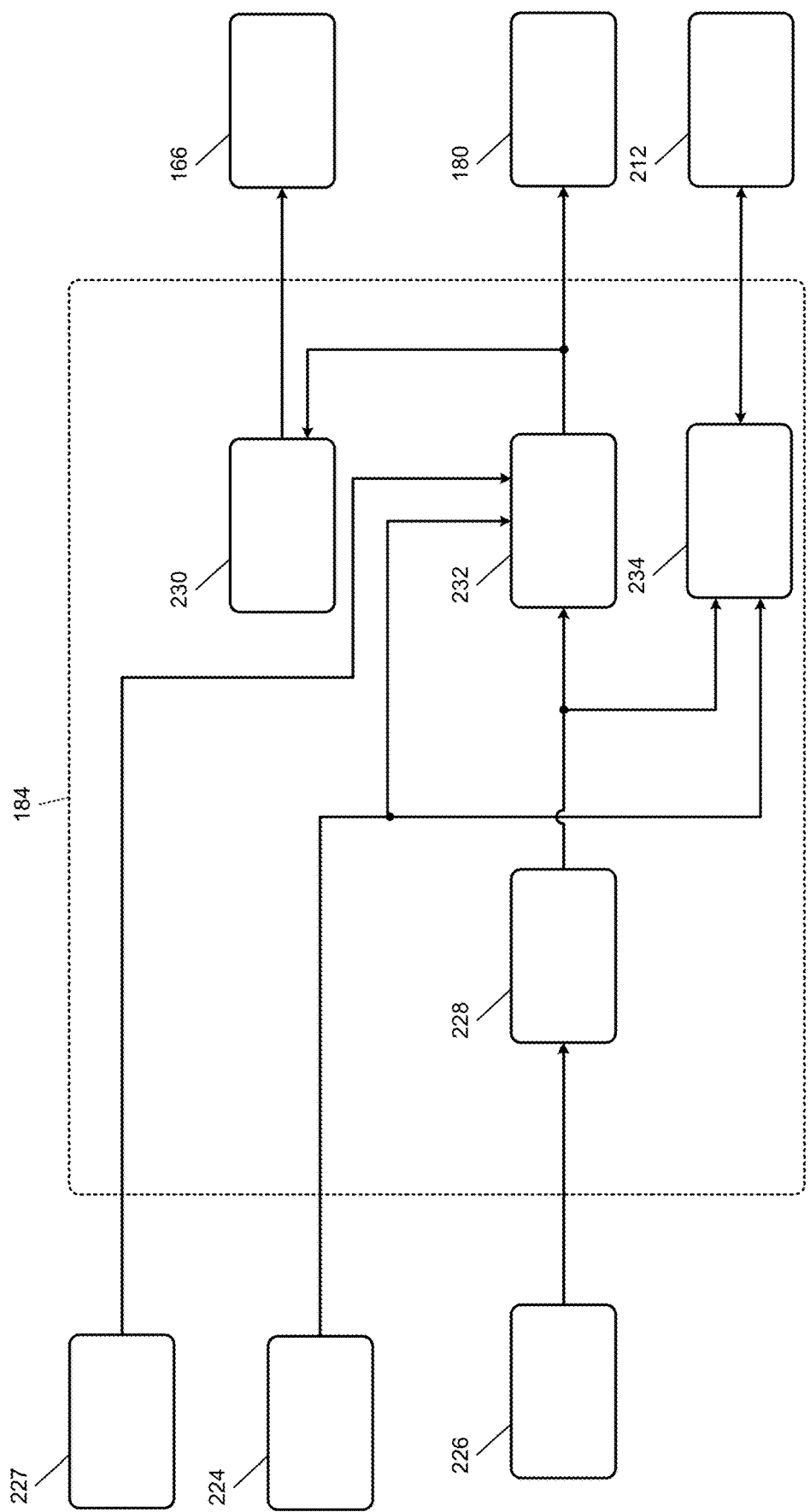
FIG. 22 is a functional block diagram of a solar panel control system according to the present disclosure.

Referring now to FIG. 22, an example of the solar panel control module 184 includes a solar angle determination module 228, a compressor control module 230, a motor control module 232, and a linear actuator control module 234. The solar angle determination module 228 receives the location of the vehicle 210 and the time of day from the GPS receiver 226 and determines one or more solar angles based on the vehicle location and the time of day. The compressor control module 230 controls the compressor 166 to inflate or deflate the first and second inflatable structures 158 and 160. The motor control module 232 controls the motor 180 to rotate the first and second rollers 154 and 156. The linear actuator control module 234 controls the linear actuator 212 to move the first ends 216 of the first and second rollers 154 and 156 in the upward and downward directions 220 and 222.

To deploy the first and second inflatable structures 158 and 160, the motor control module 232 controls the motor 180 to unwrap the first and second inflatable structures 158 and 160 from the first and second rollers 154 and 156, respectively. In addition, the compressor control module 230 controls the compressor 166 to inflate the first and second inflatable structures 158 and 160. To stow the first and second inflatable structures 158 and 160, the motor control module 232 controls the motor 180 to wrap the first and second inflatable structures 158 and 160 onto the first and second rollers 154 and 156, respectively. In addition, the compressor control module 230 controls the compressor 166 to deflate the first and second inflatable structures 158 and 160. The compressor and motor control modules 230 and 232 may receive the speed of the vehicle 210 from the vehicle speed sensor 227, and deploy or stow the first and second inflatable structures 158 and 160 based on the vehicle speed. For example, the compressor and motor control modules 230 and 232 may only deploy the first and second inflatable structures 158 and 160 at low vehicle speeds and/or when the vehicle 210 is stopped.

The motor control module 232 and the linear actuator module 234 receive the solar panel angles from the solar angle sensors 224 and/or the GPS receiver 226. The motor control module 232 controls the motor 180 to adjust the rotational angles of the first and second inflatable structures 158 and 160 based on the solar angles to maximize the solar load on the inflatable structures 158, 160. The linear actuator module 234 controls the linear actuator 212 to adjust the tilt angles of the first and second inflatable structures 158 and 160 based on the solar angles to maximize the solar load on the inflatable structures 158, 160.

Figure 23:
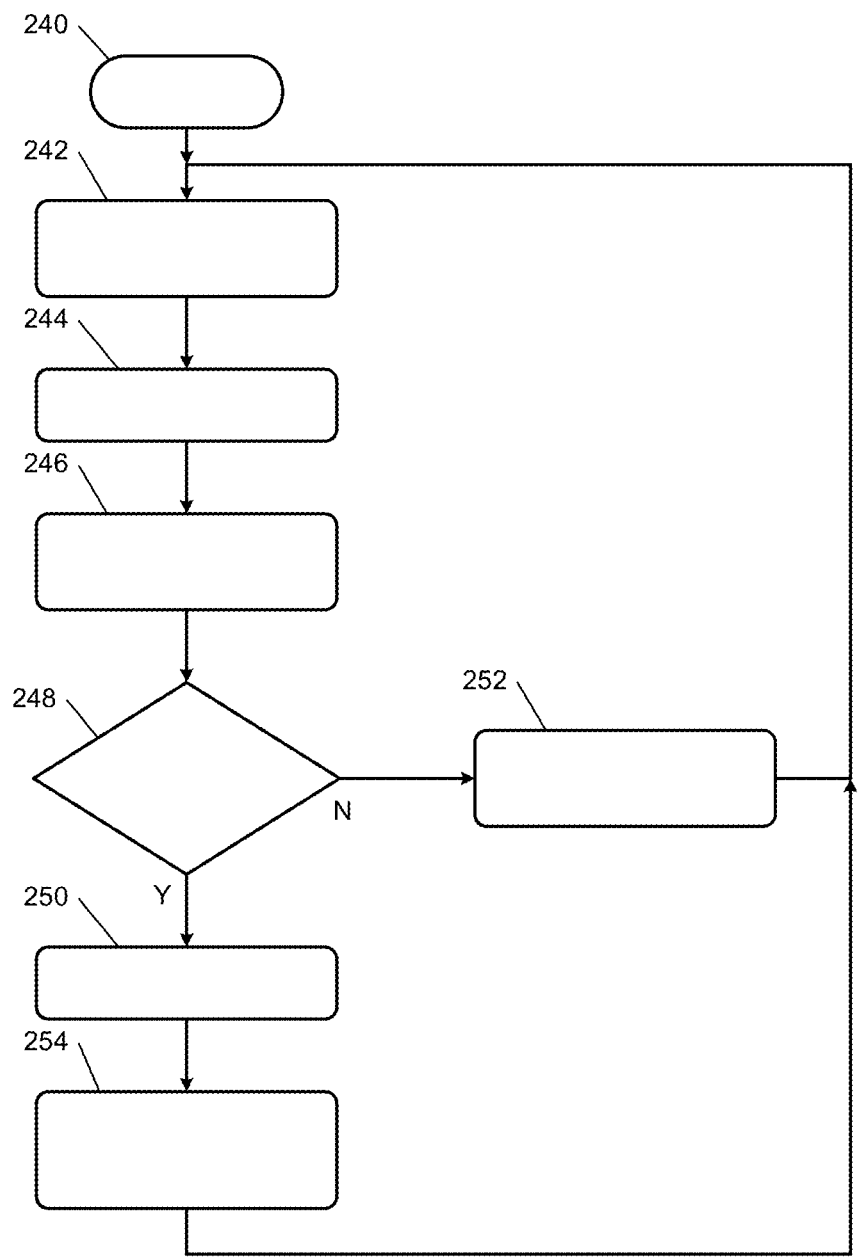
FIG. 23 is a flowchart illustrating a solar panel control method according to the present disclosure.

Referring now to FIG. 23, an example method for adjusting the tilt and rotational angles of the first and second inflatable structures 158 and 160 begins at 240. The method is described in the context of the modules of FIG. 22. However, the particular modules that perform the steps of the method may be different than the modules mentioned below and/or one or more steps of the method may be implemented apart from the modules of FIG. 22.

At 242, the vehicle speed sensor 227 measures the speed of the vehicle 210. At 244, the solar angle sensors 224 measure the solar angles. At 246, GPS receiver 226 obtains the time of day and the location of the vehicle 210.

At 248, the motor control module 232 determines whether the vehicle speed is less than or equal to a predetermined speed (e.g., a speed within a range from 0 miles per hour (mph) to 10 mph). If the vehicle speed is less than or equal to the predetermined speed, the method continues at 250. Otherwise, the method continues at 252.

At 250, the compressor and motor control modules 230 and 232 deploy the first and second inflatable structures 158 and 160. At 254, the motor and linear actuator control modules 232 and 234 adjust the rotational and tilt angles of the first and second inflatable structures 158 and 160 based on the solar angles to maximize the solar load on the inflatable structures 158, 160. At 252, the compressor and motor control modules 230 and 232 stow the first and second inflatable structures 158 and 160. After completing 252 or 254, the method may continue at 242 and continue through the loop described above as long as the vehicle 210 is operating (e.g., an ignition switch or button of the vehicle 210 is in an ON position).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," "top," "bottom," "side," and "disposed." Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. In addition, unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An inflatable system comprising:
    a bladder configured to contain fluid, the bladder including a top wall, a bottom wall opposite of the top wall, and side walls disposed between the top and bottom walls along perimeter edges of the top and bottom walls;
    a first plurality of tethers that are elongated, each tether in the first plurality of tethers having a first longitudinal end and a second longitudinal end respectively connected to the top and bottom walls of the bladder within a first region of the bladder, the first plurality of tethers having a first tether length, a first tether spacing between respective ones of the first plurality of tethers, a first tether angle relative to one of the top and bottom walls, and a first tether stiffness; and
    a second plurality of tethers that are elongated, each tether in the second plurality of tethers having a first longitudinal end and a second longitudinal end respectively connected to the top and bottom walls of the bladder within a second region of the bladder, the second plurality of tethers having a second tether length, a second tether spacing between respective ones of the second plurality of tethers, a second tether angle relative to the one of the top and bottom walls, and a second tether stiffness, wherein:
        the second tether spacing is different than the first tether spacing;
        the first plurality of tethers includes first and second sub-pluralities of tethers disposed entirely on opposite sides of the second plurality of tethers, and the second plurality of tethers is disposed entirely between the first and second sub-pluralities of tethers in the first plurality of tethers; and
        the first tether spacing of the first sub-plurality of tethers is the same as the first tether spacing of the second sub-plurality of tethers.

2. The inflatable system of claim 1 further comprising a bottom plate attached to the bottom wall.

3. The inflatable system of claim 1 further comprising a valve configured to allow fluid flow into and out of the bladder.

4. The inflatable system of claim 1 wherein the second tether length is greater than the first tether length.

5. The inflatable system of claim 1 wherein the second tether length is different than the first tether length, each tether in the first plurality of tethers has the first tether length, and each tether in the second plurality of tethers has the second tether length.

6. The inflatable system of claim 1 wherein the second tether stiffness is greater than the first tether stiffness.

7. The inflatable system of claim 1 wherein the first tether angle is a right angle and the second tether angle is an oblique angle.

8. The inflatable system of claim 1 wherein the second tether spacing is greater than the first tether spacing.

9. The inflatable system of claim 1 wherein the first region includes a first sub region disposed adjacent to a first one of the side walls and a second sub region disposed adjacent to a second one of the side walls opposite of the first side wall, and the second region is disposed between the first and second sub regions.

10. The inflatable system of claim 1 wherein at least one of:
    the second tether length is different than the first tether length;
    the second tether angle is different than the first tether angle; and
    the second tether stiffness is different than the first tether stiffness.

11. A vehicle seat comprising:
    a seat bottom; and
    a seat back,
    wherein at least one of the seat bottom and the seat back includes a first bladder configured to contain fluid, a first plurality of tethers that are elongated and disposed within the first bladder, and a second plurality of tethers that are elongated and disposed within the first bladder, the first bladder including a top wall, a bottom wall opposite of the top wall, and side walls disposed between the top and bottom walls along a perimeter of the first bladder, the first plurality of tethers having a first tether spacing between respective ones of the first plurality of tethers, the second plurality of tethers having a second tether spacing between respective ones of the second plurality of tethers, each tether in the first plurality and second pluralities of tethers having a top longitudinal end and a bottom longitudinal end respectively connected to the top and bottom walls, wherein the second tether spacing is different than the first tether spacing, wherein the first plurality of tethers includes first and second sub-pluralities of tethers disposed entirely on opposite sides of the second plurality of tethers, and the second plurality of tethers is disposed entirely between the first and second sub-pluralities of tethers in the first plurality of tethers, wherein the first tether spacing of the first sub-plurality of tethers is the same as the first tether spacing of the second sub-plurality of tethers, and wherein the first bladder is configured to be deflated when the vehicle seat is stowed and inflated when the vehicle seat is upright.

12. The vehicle seat of claim 11 wherein:

the seat bottom includes a first foam cushion and the first bladder;

the first bladder is attached to the first foam cushion, and one of the first foam cushion and the first bladder is configured to be disposed between an occupant and the other one of the first foam cushion and the first bladder when the occupant is sitting in the vehicle seat;

the seat back includes a second foam cushion and a second bladder configured to contain fluid and a third plurality of tethers disposed within the second bladder, the second bladder including a top wall, a bottom wall opposite of the top wall of the second bladder, and side walls disposed between the top and bottom walls of the second bladder along a perimeter of the second bladder, the third plurality of tethers extending between and connected to the top and bottom walls of the second bladder, wherein the first and second bladders are configured to be deflated when the vehicle seat is stowed and inflated when the vehicle seat is upright; and the second bladder is attached to the second foam cushion, and one of the second foam cushion and the second bladder is configured to be disposed between the occupant and the other one of the second foam cushion and the second bladder when the occupant is sitting in the vehicle seat.

13. The vehicle seat of claim 11 wherein at least one of the first and second pluralities of tethers has at least one of a different tether length, a different tether spacing, a different tether angle, and a different tether material.

* * * * *